US007369526B2

(12) United States Patent
Lechleider et al.

(10) Patent No.: US 7,369,526 B2
(45) Date of Patent: May 6, 2008

(54) FLEXIBLE TRANSPORT SYSTEM INCLUDING SUPPORT FOR BILATERAL USER ACCESS

(75) Inventors: Joseph William Lechleider, Philadelphia, PA (US); Stephen B. Weinstein, Summit, NJ (US)

(73) Assignee: The Kohl Group, Inc., Parsippany, NJ (US)

( * ) Notice: Subject to any disclaimer, the term of this patent is extended or adjusted under 35 U.S.C. 154(b) by 0 days.

(21) Appl. No.: 10/939,870

(22) Filed: Sep. 13, 2004

(65) Prior Publication Data

US 2005/0123004 A1 Jun. 9, 2005

Related U.S. Application Data

(60) Provisional application No. 60/501,668, filed on Sep. 11, 2003.

(51) Int. Cl.
*H04Q 7/00* (2006.01)
(52) U.S. Cl. ............... 370/334; 375/267; 375/347; 455/101
(58) Field of Classification Search ............... None
See application file for complete search history.

(56) References Cited

U.S. PATENT DOCUMENTS

| 5,426,668 | A | 6/1995 | Lechleider |
| 5,440,594 | A | 8/1995 | Lechleider |
| 5,621,768 | A | 4/1997 | Lechleider |
| 5,621,786 | A | 4/1997 | Fischer et al. |
| 6,006,110 | A * | 12/1999 | Raleigh .................. 455/561 |
| 6,052,594 | A * | 4/2000 | Chuang et al. ............ 455/450 |
| 6,058,109 | A | 5/2000 | Lechleider |
| 6,101,399 | A * | 8/2000 | Raleigh et al. ............ 455/561 |
| 6,249,250 | B1 | 6/2001 | Namekata et al. |
| 6,298,092 | B1 * | 10/2001 | Heath et al. .............. 375/267 |
| 6,351,499 | B1 * | 2/2002 | Paulraj et al. ............ 375/267 |
| 6,359,883 | B1 | 3/2002 | Lechleider |
| 6,400,699 | B1 * | 6/2002 | Airy et al. ................ 370/329 |

OTHER PUBLICATIONS

Ponnekanti et al, An Overview of Smart Antenna Technology For Heterogeneous Networks, IEEE, pp. 14-23, 1999.*
Sollenberger et al, Advanced Cellular Internet Service (ACIS), IEEE, pp. 150-159, Oct. 1998.*
Max H.M. Costa, Writing on Dirty Paper, IEEE Transactions on Information Theory, May 1983, pp. 439-441, vol. IT-29, No. 3.
Wei Yu, Arak Sutivong, David Julian, Thomas M. Cover and Mung Chiang, Writing on Colored Paper, Article ISIT2001, Washington, DC, Jun. 24-29, 2001, p. 302, Information Systems Laboratory, Stanford University, Stanford, CA.

(Continued)

*Primary Examiner*—Frank Duong
(74) *Attorney, Agent, or Firm*—Lerner, David, Littenberg, Krumholz & Mentlik, LLP

(57) ABSTRACT

One aspect of the present invention is a method for the wireless transmission of information from one or more antennas to one or more separate users. The method comprises processing information to produce transmission vectors that minimize simultaneous interference between separate user channels and adjusting the radiation patterns to minimize total system radiation power for users specified capacities. In another aspect, the present invention includes apparatus and methods for providing multiple users of a network with information in such a manner that only the user that the signals are intended for receives the information.

25 Claims, 10 Drawing Sheets

OTHER PUBLICATIONS

Wei Yu, David P. Varodayan and John M. Cioffi; Trellis and Convulational Precoding for Transmitter-Based Interference Presubtraction, Jul. 2005, pp. 1220-1230, vol. 53, No. 7, IEEE Transactions on Communications.

Andrea Goldsmith, Syed Ali Jafar, Nihar Jindal and Sriram Vishwanath, Capacity Limits of MIMO Channels, IEEE Journal on Selected Area in Communications, Jun. 2003, pp. 684-702, vol. 21.

Syed A Jafar, Gerard J. Foschini, and Andrea J. Goldsmith, Phantom Net: Exploring Optimal Multicellular Multiple Antenna Systems, IEEE, 2002, pp. 261-265.

Shlomo Shamai (Shitz) and Benjamin M. Zaidel, Enhancing the Cellular Downlink Capacity via Co-Processing at the Transmitting End, pp. 1745-1749, The Department of Electrical Engineering, Tecnion-Israel Instittute of Technology, Haifa 32000, Israel.

Jafar et al., *PhantomNet: Exploring Optimal Multicellular Multiple Antenna Systems*, IEEE, 2002.

Shamai et al., *Enhancing the Cellular Downlink Capacity via Co-Processing at the Transmitting End*, IEEE, 2001.

Blachman, Nelson M., Communication as a Game, IRE Wescon Conveention Record, Part 2, Circuit Theory - Information Theory, Aug. 20-23, 1957.

Electronic Letters - An International Publication, New Automatic Equaliser Employing Modulo Arithmetic, vol. 7, Mar. 25, 1971.

Fudenberg et al., Game Theory, The MIT Press, 1991.

Gallager, Robert G., Information Theory and reliable Communication, John Wiley and Sons, Inc., 1968.

Gitlin et al., Data Communications Principles, Plenum Press, 1992.

Lechleider, Joseph W., The Optimum Combination of Block Codes and Receivers for Arbitrary Channels, IEEE, vol. 38, No. 5, May, 1990.

Palomar, et al. Uniform Power Allocation in MIMO Channels: A Game-Theoretic Approach, IEEE, vol. 49, No. 7, Jul. 2003.

Young, Robert M., An Introduction to Nonharmonic Fourier Series, Academic Press, 1980.

\* cited by examiner

FLEXIBLE TRANSPORT SYSTEM INCLUDING SUPPORT FOR BILATERAL USER ACCESS

CROSS-REFERENCE TO RELATED APPLICATIONS

This application claims the benefit of the filing date of U.S. Provisional Patent Application No. 60/501,668, filed on Sep. 11, 2003, the disclosure of which is hereby incorporated herein by reference.

BACKGROUND OF THE INVENTION

Operators of cable communication systems have implemented a range of digital services, including digital video programming on various pay plans and broadband Internet access. Until recently, telephony was less pervasive on these systems, but is now being provided on some of these systems at an increasing rate. Cable operators have typically provided these digital services on modern hybrid fiber-coax (HFC) systems that typically provide relatively high capacity, interactive digital communication and fairly good system reliability. In these systems, however, virtually all server functions are concentrated in the cable headend.

However, the cable drop, from a tap to a subscriber's residence, remains a vulnerable and trouble-prone element, offering an opportunity for service improvement and maintenance cost reduction if the cable drop could be replaced with a more reliable, but still economical wireless alternative. Furthermore, there are additional service opportunities, not yet addressed, in the mobility needs of subscribers and others, including wireless delivery of entertainment services that have so far been largely confined to cables, and providing Wireless internet service provider (WISP) and microcellular mobile services, e.g., cellular telephony. Furthermore, reliance on an all-packet architecture may make a cable system part of the rapidly developing multimedia Internet with its, thus far, unparalleled potential for new media applications.

Outdoor WISP architectures, for example, Ricochet's relayed wireless access service in the 900 MHz band and Virginia Tech's "local neighborhood" LMDS in the 28 GHz band, are typically considered among the precedents for the concept of combining some kind of wireless drop with a wired access network. However, these systems do not address enhancements of existing cable distribution systems that may now take advantage of relatively inexpensive IEEE 802.11 wireless LAN (WLAN) technology in the unlicensed bands, provided appropriate spectral management techniques are used.

Although specific antenna architectures might be employed to create directivity between a specific access-user antenna-pair, economic considerations typically dictate that all access antennas are selected from a small set of designs and that all users' antennas are also chosen from a small set of choices. Furthermore, access antennas typically must be placed where convenient along the access line and users are usually distributed non-uniformly near the access line and at varying distances from it. All of this points to the fact that usually there will be interference between the channels serving different individual users, unless means are taken to eliminate it. Even if sub-channels of different users of the system are separated by other means of multiplexing, the need for privacy dictates the elimination of coupling between separate users' channels. The wireless channels to different users might be separated, to some extent, by using different frequency bands for different users, or by using time division or packet division multiplexing. But these methods do not use the systems capabilities efficiently and flexibly and they require relatively expensive processing equipment on the users' premises.

Of utility then are systems, apparatus and methods that allow bilateral and flexible subscriber access to an information transport system.

SUMMARY OF THE INVENTION

In one aspect the present invention is a system, which is preferably internet protocol (IP) based, that uses routing in an access line transponder to deliver selected programs or information to one or more subscribers. Most preferably, the system reduces radio interference through the use of adaptive antennas distributed along the line, which are preferably collectively excited as superantennas.

In another aspect, the present invention is a method for selectively transmitting information to one or more subscribers that are located within the reach of access line antennas whose signals preferably interfere in such a manner such that each subscriber securely receives the information destined for that user. In accordance with this aspect of the present invention, an information segment is transmitted to a plurality of users over a plurality of access-line antennas. In transmitting an information segment to a given user, a sequence of vector excitation signals comprising the information segment are desirably created for the plurality of access-line antennas, which are preferably designed for a particular reception epoch, to maximize received signal strength at the target user node while minimizing the received strength at the other user nodes.

In accordance with a further aspect of the present invention, wireless drops for cable subscribers, using WLAN, for example, and advanced signal processing techniques is provided. In accordance with this aspect of the present invention, transponder nodes and antennas are preferably densely deployed along access cable lines, e.g., those preferably running along a street or up a high-rise building to serve residential and/or business customers, effectively replacing the cable taps to which drop cables are usually attached in current practice. Access may then be desirably provided to user nodes that are either fixed (e.g., in residences) or mobile (e.g. handsets, PDAs, Internet radios carried by pedestrians), and moving users could be tracked by the system. Antenna excitation and signal processing technologies, focused on interference prevention, preferably support reliable, secure, high-capacity communication with each subscriber's wireless node. In accordance with this aspect of the present invention, the relatively low and still-falling costs of wireless nodes may desirably allow rapid investment recovery through service cost savings and new services revenues.

In another aspect, the present invention is a system, that preferably utilizes packet communication in an existing hybrid fiber/coax digital network, and preferably provides high-speed, short-range wireless access to video programming services, to the Internet, and to the telephone, cellular mobile, and other communication networks. Wireless access may be provided to both fixed (residential) and entertainment systems and to passersby with portable devices. Smart wireless transponder nodes and adaptive antennas are most preferably densely distributed along an access cable line for wireless communication with user nodes that desirably include adaptive antennas. The antennas along the cable access line, in accordance with a further aspect of the present invention, preferably form an adaptive superantenna that is preferably excited, for downstream transmission, by vector signals that cancel radio interference. These excitations may be derived from an adaptive process.

In accordance with an additional aspect of the present invention, upstream transmission from a subscriber node is designed so that the vector received by the superantenna can be used to separate this signal from that of other users' nodes or transmitters. Cooperation among end users is typically not necessary, but is possible. Antenna excitation signals are preferably controlled from the system headend, based on processing that uses measured matrix channel parameters between the collections of transponder antennas and user antennas. A program controller in the headend, responding to end user requests, preferably manages delivery of selected program streams and other customer services through generation of superantenna excitation signals that target specific end users. This and other aspects of the present invention offer opportunities for a wide range of programming and customized private services.

In another aspect, the present invention desirably provides flexible capacity allocation, such that capacity allocations to subscribers may be adjusted to be uniform. This aspect of the present invention also desirably supports robustness through a soft failure mode of operation in which the workload of a failed transponder and/or access line antenna may be taken up, in whole or part, by other transponders or access line antennas.

In yet another aspect, the present invention desirably provides an infrastructure adequate for a full range of services, symmetric or asymmetric, including Internet access, entertainment access, and cellular and voice network access. Quality of Service (QoS) desirably follows from the physical-level techniques for preparing and transmitting signals and from allocation of capacity in dedicated paths (e.g., set up using Multi-Path Label Switching (MPLS)) for traffic service classes (e.g. DiffServ classes). Proxy content servers may be implemented in the headend. Appropriate AAA (authentication, authorization, accounting), provided in-system or from an outside vendor, can support a high level of security and customer account functionality. The system architecture preferably routes traffic to the appropriate end-user destinations and control packets to the transponders. These capabilities support efficient service multiplexing and, among other possibilities, program storage at and deferred delivery from the headend (shared digital recorder service).

In another aspect the present invention is a radio architecture that comprises a signaling structure, preferably using unlicensed IEEE 802.11 WLAN technology, that preferably exploits a multiplicity of adaptive antennas to minimize interference among users despite dense spacings of transponders and antennas. In particular, access-line antennas are pooled into a superantenna. To transmit an information segment to a given user, the system preferably creates vector excitation signals (embodying the information segment) for the superantenna that is designed, for a particular reception epoch, to maximize received signal strength at the target user node while minimizing the received signal strengths at other user nodes. For a given transmission band, basis functions used by the excitation vectors preferably adapt over time to changes in the propagation parameters. This is a multiple access technique, and it can also be overlaid on other multiple access techniques such as optical frequency division multiplexing (OFDM) or time division multiplexing (TDM).

In another aspect, the present invention is an apparatus preferably comprising a first module for generating at least one vector based on channel parameters and a second module for computing parameters associated with information to be transmitted to a predetermined user from among a plurality of users. The information is preferably transmitted using one or more transmitters. In addition, the computed parameters are preferably based on the at least one vector and used to transmit the information to a plurality of receivers such that only the predetermined user receives a portion of the information intended for the predetermined user, while the other users' receivers are adapted to nullify the portion of the information intended for the predetermined user.

Further in accordance with this aspect of the present invention, the apparatus further desirably includes an encoder operable to encode the parameters into a drive signal that is used to generate a radiation pattern on a plurality of antennas associated with the transmitters.

Further in accordance with this aspect of the present invention, the apparatus desirably comprises an encoder operable to encode the parameters onto a drive signal that is used to generate a radiation pattern on at least one antenna that preferably transmits the information to the intended user by radiating substantially lower signal levels to users other than the predetermined user.

Further in accordance with this aspect of the present invention, the channel parameters preferably comprise parameters measured from a wireless channel. In addition, the information is preferably transmitted using data packets. Most preferably, the data packets are encoded in accordance with the Internet Protocol.

In another aspect, the present invention is a system for transmitting signals over a network. The system preferably comprises a processor for accumulating packets destined for one or more subscribers on a network and for computing a set of radiation patterns for antennas in the network. The system further desirably comprises an encoder for encoding the radiation patterns into one or more data blocks, each of the data blocks being addressed to different transponders associated with the antennas such that when the transponder excite the antennas the radiation pattern desirably determines an intended recipient from among the one or more subscribers for at least one of the packets.

Further in accordance with this aspect of the present invention, the antennas comprise a superantenna that determines the intended recipient by generating a radiation pattern for which the receivers of the other subscribers have been adapted to nullify information not intended for the other subscribers.

In another aspect, the present invention is a method for preparing information for transmittal over a network. The method preferably comprises receiving a data sequence associated with users on the network, converting the data sequence into a set of cooperative radiation patterns, and superposing the radiation patterns associated with different users such that the radiation patterns when transmitted are shaped to maximize the energy received at a destination receiver and minimize interference at neighboring receivers.

In a further aspect, the present invention includes a method for a wireless transmission of information. The method preferably comprises assembling one or more data packets comprising the information; associating a radiation pattern with the assembled data packets to produce a drive signal; exciting one or more antennas with the drive signal such that the energy arriving at a subscribers antenna allows the subscriber's receiver to output only the information intended for that subscriber.

Other aspects of the present invention include a system for bilateral communication that uses a non-linear filtering technique to efficiently pre-cancel interference. The system preferably includes a headend processor or equivalent distributed processors that computes basis vectors from which to compose antenna excitation vectors. Further in accordance with this aspect of the present invention, the system further comprise wireless transponders that are operable to store the optimum basis vectors and generate the antenna excitation vectors from coded data blocks transmitted by the headend processor.

Further in accordance with this aspect of the present invention, the wireless transponders preferably radiate downstream signals in a cooperative manner controlled by the headend processor, and wherein the wireless user notes need not cooperate for upstream transmission although such cooperation may be used for performance enhancement. The system advantageously allows subscribers to rearrange antennas without the involvement of the system operator. The system may also be desirably implemented in a hybrid fiber coax environment.

DETAILED DESCRIPTION

Figure 1:
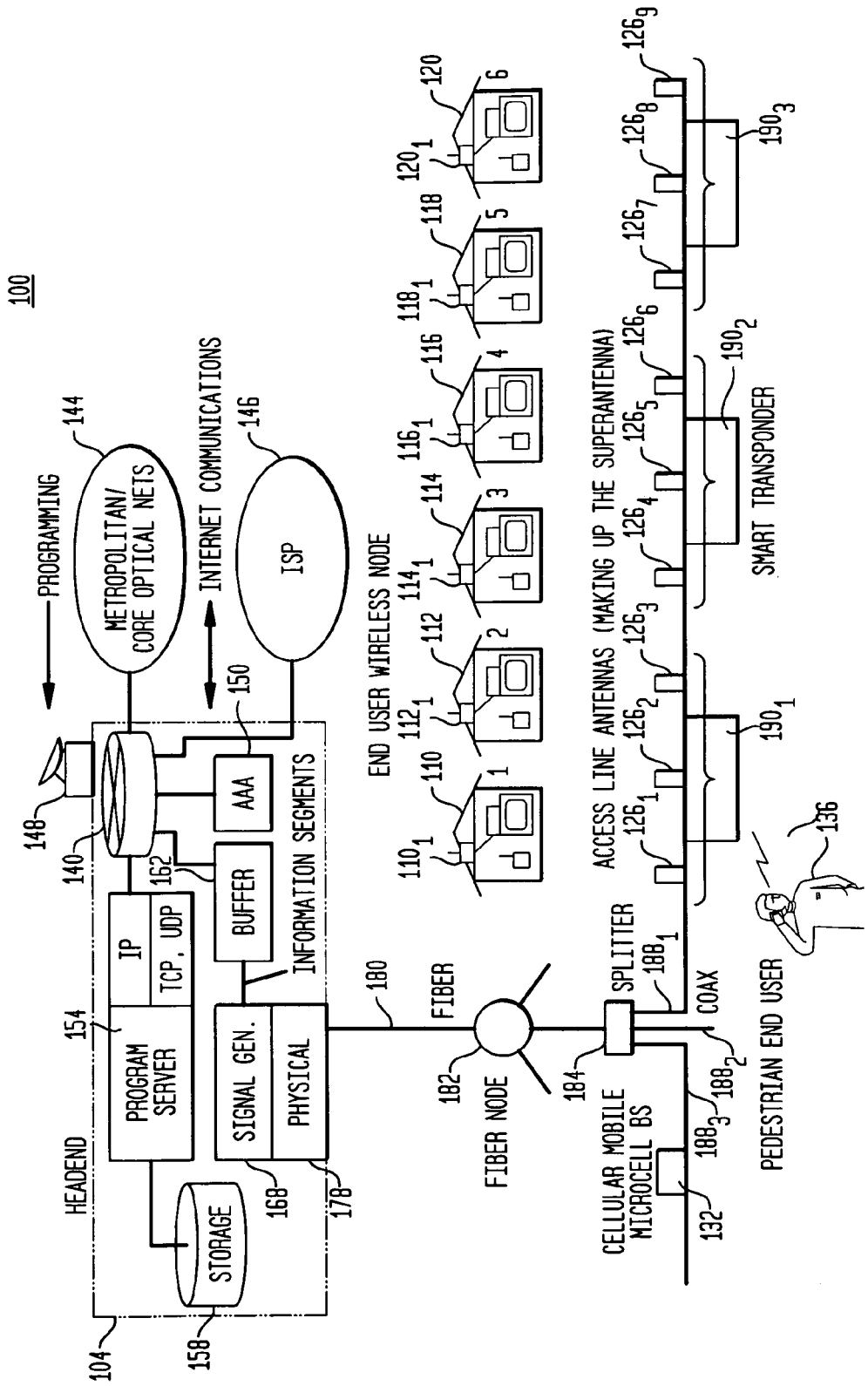
FIG. 1 illustratively depicts a system in accordance with an aspect of the present invention.

FIG. 1 illustrates a system 100 in accordance with an aspect of the present invention. The system comprises a headend 104 that preferably transmits programming information to a plurality of end user/subscriber locations 110, 112, 114, 116, 118 and 120 using a plurality of access line antennas 126. A subscriber node $110_1$, $112_1$, $114_1$, etc., is provided at each subscribe location in accordance with an aspect of the present invention. In addition, the system 100 may also desirably include a cellular mobile base station 132 that supports mobile end users, such as for example mobile end user 136.

As shown in FIG. 1, the headend 104 comprises a routing module 140 that is coupled to metropolitan or optical network 144, internet service provider 146 and broadcast antenna station 148, which selectively provide programming and/or content information to subscribers or end users. The headend further comprises an AAA module 150, which provides authentication, authorization and accounting functionality associated with providing information between a subscriber, e.g., a subscriber at location 110-112, or mobile end user 136 and service providers or network operators. The headend 104 also preferably includes a program server 154 that preferably operates using the internet protocol (IP) and TCP or UDP at the appropriate layers of the 7-Layer Open System Interconnect (7-Layer OSI) reference model. As shown, the program server 154 is coupled to a storage element 158 as well the routing module 140. The headend 104 further preferably includes a buffer 162 that is coupled to the routing module 140. The buffer 162 preferably stores information or information segments that are destined for users or subscribers. The buffer 162 is also coupled to signal generator 168 that preferably generates vector excitation signals (embodying the information segments) for the access line antennas 126. As shown, the signal generator 168 includes a physical layer block 178 for transmitting the vector excitation signals in a format appropriate for the media that the headend 104 is connected to. As shown, the headend 104 is preferably connected to fiber media 180, although any other type of cable media, such as, for example, coaxial cable may be used. The fiber 180 is connected to fiber node 182, which is also connected to a splitter 184. The medium between the headend and transmitting antennas is not limited to fiber or coaxial cable, but may also include any other medium of sufficient capacity including wireless. In addition, the access line may comprise any backbone channel, such as a multi-hop radio channel.

The splitter 184 divides the signals received from the fiber node 182 in two or more other signals that transmitted on two or more cables, $188_1$, $188_2$, $188_3$. In accordance with an aspect of the present invention, the cable $188_1$ forms an access line that includes a plurality of access line antennas 126 that are excited by the vector excitation signals such that only the information segments intended to reach a particular user or subscriber reaches only that subscriber and no other. As shown in FIG. 1, the antennas 126 are excited by transponders 190. Each transponder 190 preferably transmits a signal onto to one or more antennas 126, which excites or drives the antennas to radiate energy towards antennas at a users' location. As shown, for example, transponder $190_3$ preferably transmits a signal using antennas $126_7$, $126_8$ and $126_9$. Although each transponder in FIG. 1 is shown as transmitting a signal using three antennas, other transponder antenna combinations may also be employed. The antennas 126 deployed along the access line $188_1$, make-up a superantenna in accordance with an aspect of the present invention.

In accordance with an aspect of the present invention, the system of FIG. 1 may be preferably provided as an overlay on existing hybrid fiber-coax (HFC) systems, supporting both fixed and mobile/portable end users. Microcellular base stations are feasible along with the access points distributed along the access line. The existing distribution network down to the access cable with its (present) taps may be left unchanged. The high-capacity wireless hop from antennas along the access line (making up the superantenna) to user nodes may preferably use (at present) the IEEE 802.11a standard.

Figure 2:
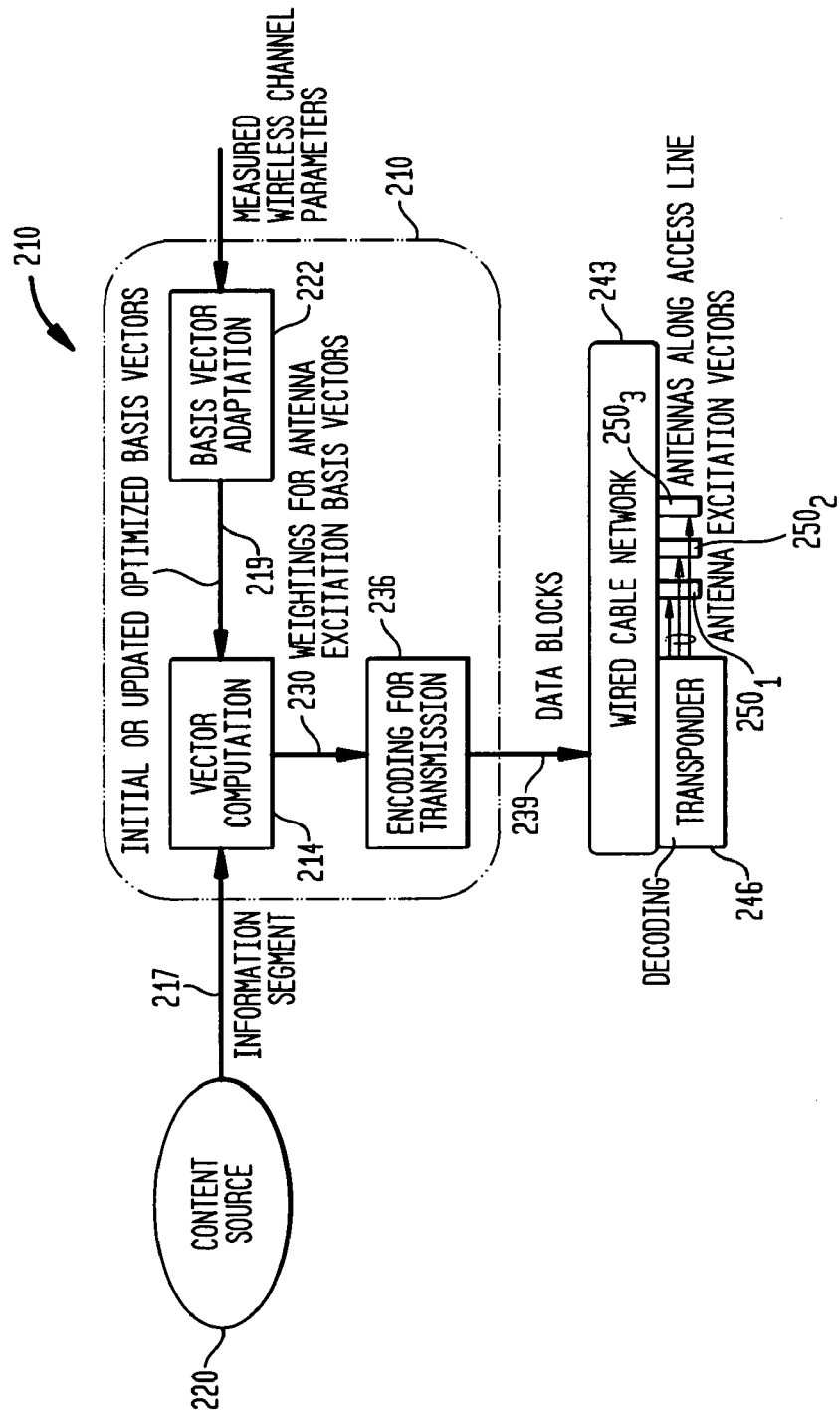
FIG. 2 illustratively depicts a headend processor in accordance with an aspect of the present invention.

The superantenna excitation vectors appropriate for delivery of information segments to end users may be computed in a two-step adaptation and vector generation process illustrated in FIG. 2 and described in further detail below. In particular, FIG. 2 shows a possible arrangement of the functional modules of a signal generator 210 in accordance with an aspect of the present invention. As the FIG. 2 shows, the generator 210 includes a vector computation module 214, which receives one or more information segments 217 from a content source 220. The content source 220 may comprise the buffer 162 or any other source of information comprising image, video, text, sound or any other type of information or data. Such information or data is preferably in digital form, however other data formats may be used.

The vector computation module 214 also receives as input initial or updated basis vectors 219 from a basis vector adaptation module 222. The vector adaptation module 222 produces the basis vectors 219 based on various measured wireless channel parameters 225 as is discussed in further detail below. The vector computation module 214 uses information segments 217 and basis vectors 219 to produce weightings or parameters for the antenna excitation basis vectors 230. The weightings 230 are then encoded for transmission by encoder 236. The various functional modules of the signal generator 210 may implemented in software or firmware in combination with a microcomputer or digital signal processor or by using available digital signal processing techniques.

The data blocks 239 from encoder 236 are fed over a wired cable network 243 to a transponder 246, which decodes the data blocks into antenna radiation vectors and drives the antennas 250 in accordance with the antenna excitation basis vectors. In an aspect of the present invention, the data blocks may comprise just the weightings or parameters. If such is the case, then the transponder may compute the radiation vectors or antenna excitation basis vectors based on the weights or parameters provided by the headend and basis vectors stored at or by the transponder. A possible alternative is to have the computation done by or at the headend and transmitted to the transponder. The antenna excitation vectors preferably excite the antennas on the line, e.g., superantenna, such that each user or subscriber is able to receive only the information intended for that user or subscriber.

The adaptation process performed by adaptation module 222 is preferably performed in advance and whenever the radio channel changes and desirably selects the most efficient subspace of available radiation vectors, spanned by a set of optimized basis vectors. The remaining potential radiation vectors are typically not used. The basis vectors are preferably derived from a channel transfer matrix between the multiple access line antennas and the multiple user antennas (or their array elements). As is discussed in further detail below, stable global optimization of the basis vectors may be reached through an iterative process.

As previously discussed, the superantenna excitation vectors are computed periodically based on incoming information segments, using the previously computed optimized basis vectors. These excitation vectors are encoded into data blocks for transmission through the (wired) cable system to the transponders. The encoding of excitation vectors into transmission data blocks is preferably reduced to encoding only the weights of optimized basis vectors rather than the full excitation waveforms, and only a modest number of optimized basis vectors are likely to be used, as described below. The excitation vectors for a particular information segment of, for example, 100 bits is encoded into at least as many bits defining weights for the optimized basis vectors. There is a tradeoff between the granularity of the weights used, the dimensionality of the subspace used, and the vector transmission rate, which are all affected by ambient noise and the transmission capacity of the line. Each transponder may, as shown in FIGS. 1 and 2, drive several distributed antennas within a superantenna.

Figure 3:
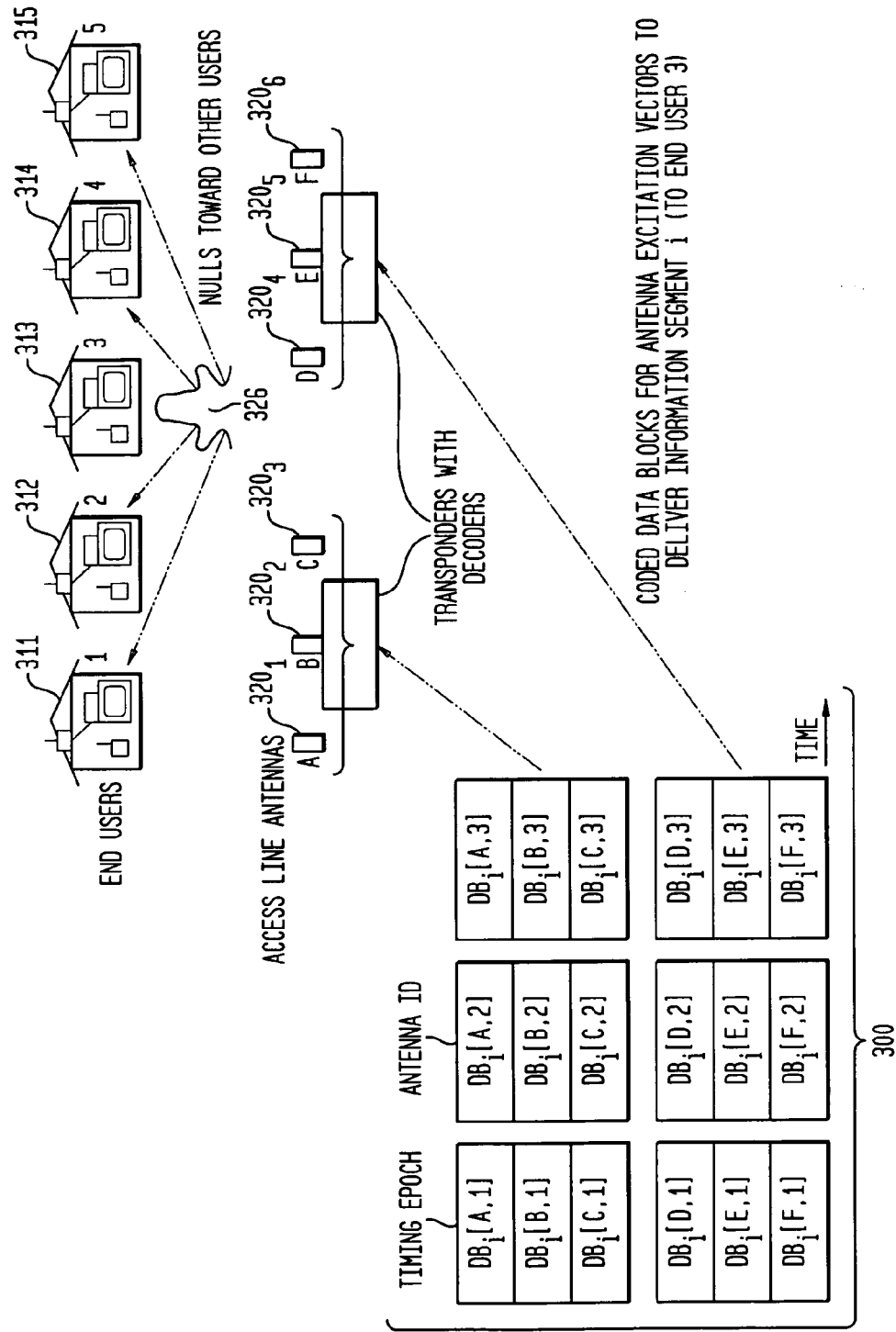
FIG. 3 illustratively depicts delivery of information in accordance with an aspect of the present invention.

FIG. 3 illustrates delivery of an information segment i or 300 destined to a user 313. The superantenna 320 is preferably excited such that the antenna radiation pattern 326 preferably provides a strong signal for subscriber 313 while creating little or no interference at the antennas of other subscribers (e.g., subscribers 311, 312, 314 and 315) who may be receiving (other) information from the superantenna 320 in the same transmission band at the same time. Although FIG. 3, for simplicity, shows data blocks defining antenna excitation for delivery of information to one subscriber only, data blocks can be created at a headend that represent the superposition of antenna excitations intended for delivery of different information segments to different users. The transponders, in addition to decoding data blocks from the headend into antenna radiation signal vectors, gather propagation information for the links and relay this information to the headend processor as input for the calculation of the optimized excitation basis vectors (e.g., block 222 in FIG. 2 receives measured wireless channel parameters as input), as described in further detail below. New antenna excitation patterns are needed when the channel significantly changes, as might happen, for example, when an automobile passes by on the street in the vicinity of antennas.

At a user node the receiver comprises a bank of matched filters or the equivalent, spanning the subspace of received radiation patterns optimal for this user according to signal to noise ratio. For transmitting upstream, the user excitation vectors are generated for its adaptive antenna in a manner similar to that used at the headend processor for the superantenna in the downstream direction. It is possible, in the interest of reducing home wiring, to have multiple wireless nodes in the subscriber's location communicating with the cable access line antennas. However, a simpler architecture may use a single externally-mounted user wireless node that communicates both with the superantenna and with wireless devices in the residence, with appropriate spectrum management. Mobile and pedestrian users can also gain access, paying for this service by credit card or by roaming agreements between the cable operator and cellular mobile or WISP services providers.

The system illustrated by FIG. 1 preferably provides a minimum available capacity to each user at least comparable to a 50 Mbps IEEE 802.11a channel. This may prove advantageous in the future where a given residence may generate sufficient demand, for example, from operation of several HDTV television sets at the same time, to require this capacity level. In fact, should the demand from a single residence exceed the capacity of a single channel, the superantenna desirably allows additional capacity to be at least temporarily borrowed. With its orthogonal wireless channels to different users, spectrum can be reused among closely spaced users.

Figure 4:
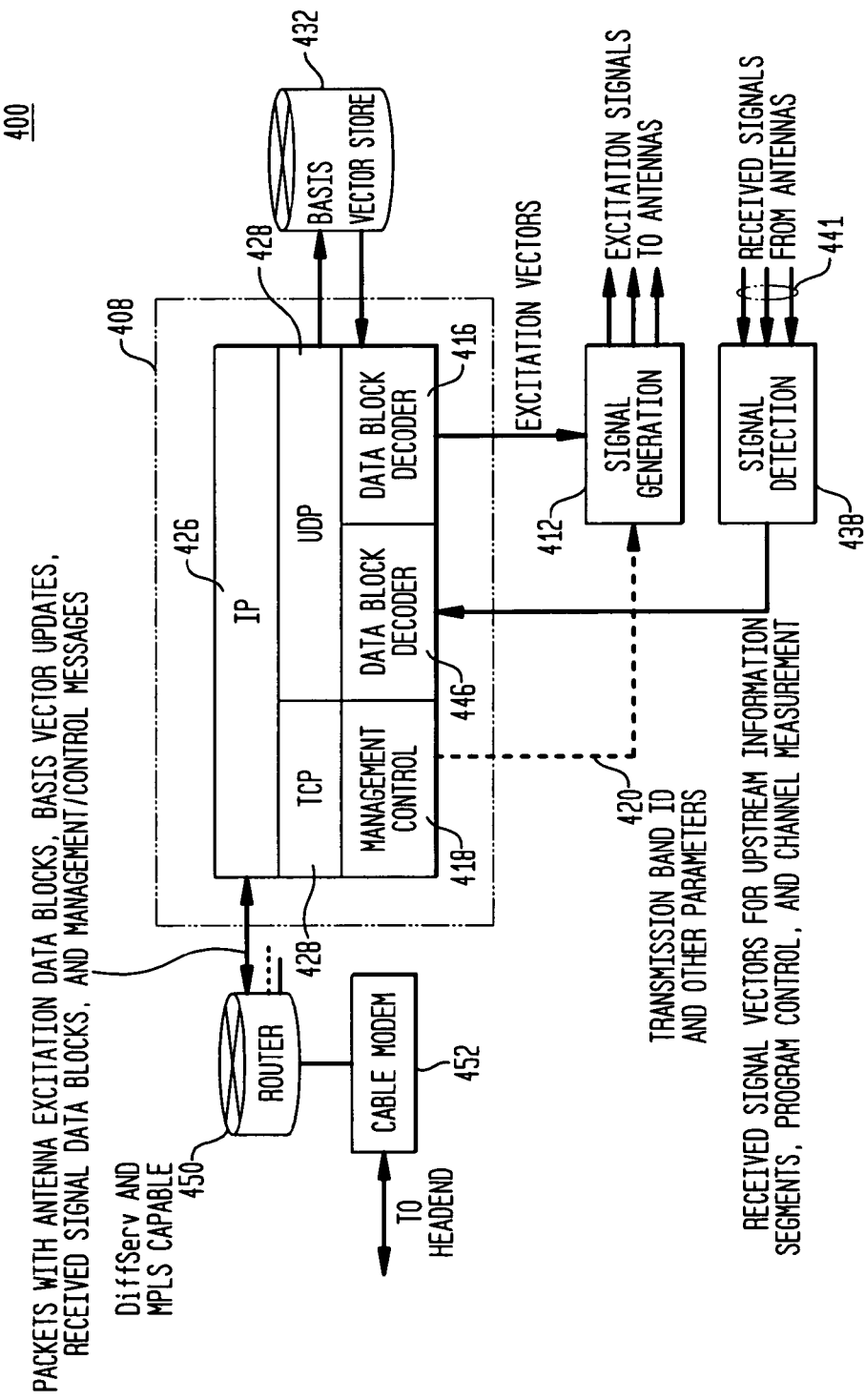
FIG. 4 illustrates a transponder in accordance with an aspect of the present invention.

FIG. 4 illustrates a transponder 400, which for simplicity is shown supporting a single subscriber, in accordance with an additional aspect of the present invention. As shown, the transponder 400 includes a local controller module 408, which preferably implements both radio link control and program delivery control, preferably in accordance with instructions from a headend. The transponder includes a signal generator 412, which generates and transmits excitation signals to antennas in response to excitation vectors or parameters received from the headend and decoded by a data block decoder 416. The transponder includes a module for receiving management and control information 418 from the headend, including transmission band identifiers and other parameters 420. The controller also preferably include modules 426, 428 for communicating information using the internet protocol (IP) and TCP or UDP at the appropriate layers of the 7-Layer Open System Interconnect (7-Layer OSI) reference model. Although the various aspects of the present invention are described herein with respect to IP and TCP or UDP protocols, other protocols may be used to perform this functionality.

The transponder 400 may further desirably include a storage area 432 for storing the various basis vectors it uses to operate. The transponder 400 also preferably includes a detector 438 for receiving signals 441 from one or more subscriber antennas. These received signals preferably include upstream information segments (e.g., content or other information generated by a subscriber), program control (e.g., a subscriber's request for content) and channel measurement information. The received signals 441 are encoded by data block encoder 446, passed up the stack to a router 450. The router 450 sends the received signals to a cable modem 452 for transmission to the headend. The cable modem 452 also operates to receive information segments, management/control information and basis vectors from the headend, which are then passed to the router 450 for further processing as discussed above. Although, a cable modem 452 is used in describing this aspect of the present invention, a DSL or other suitable modem may be also be used.

The radio link control of the transponder 400 relays channel measurements (including identification of reachable users) to the headend, receives and stores updated antenna excitation basis vectors when they come from the headend, and decodes the periodic data blocks into antenna excitation vector signals. Generally, only currently used content is delivered. In some instances, there may not be enough wireless capacity to support a large number of broadcast channels as in conventional cable television, however these shortcomings may be overcome with future technological developments. The headend routes currently used content on user request or in some alternative subscription push service, and can include mechanisms for mutual authentication between the operator's system and the user. Although the local controller 408 has been portrayed here as largely a pass-through to the headend for control functions, future configurations might decentralize some of the functions including antenna basis vector computation and program delivery control, thereby simplifying the design and processing requirements of the transponder.

Figure 5:
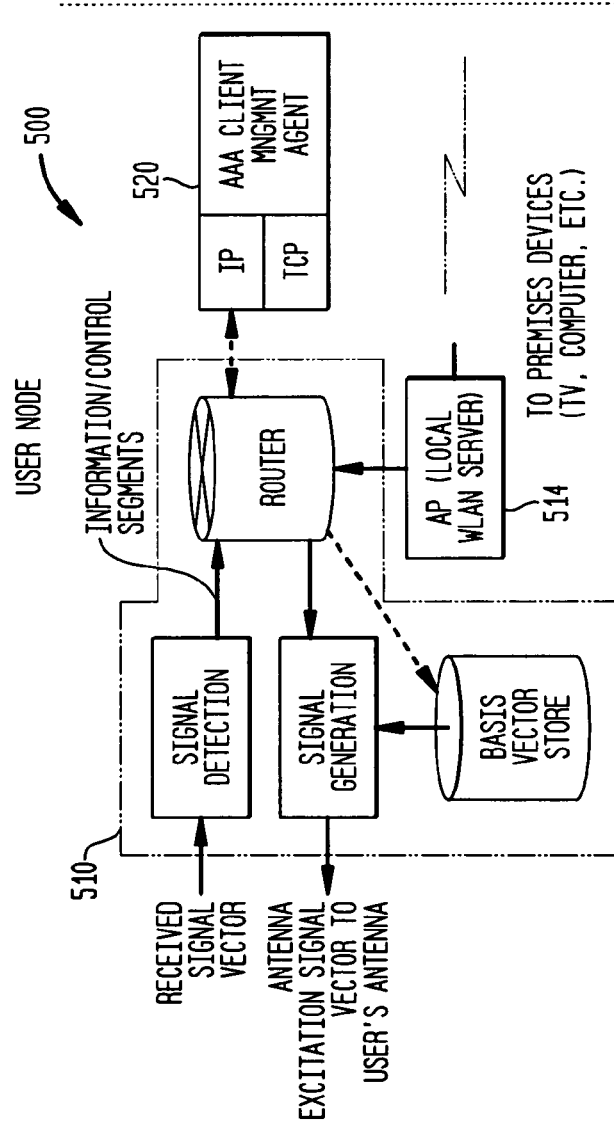
FIG. 5 illustrates a user node in accordance with an aspect of the present invention.

FIG. 5 depicts a user node 500 in accordance with an additional aspect of the present invention. The user node 500 preferably includes a WLAN client 510 for communication with the superantenna, and, for residential users, one or more network interfaces 514 for communication with in-home devices. FIG. 5 illustrates a node with WLAN interfaces in both directions. The node preferably includes a management agent 520 that may, for example, participate in service measurement functions, but acts as a pass-through for the program control messages. These messages are presumed to go to and come from a user IP appliance 550 exercising the full protocol stack including the Real-Time Protocol and the Real-Time Streaming Protocol. Alternatively, a program control translation function can be implemented in the user node.

Figure 6:
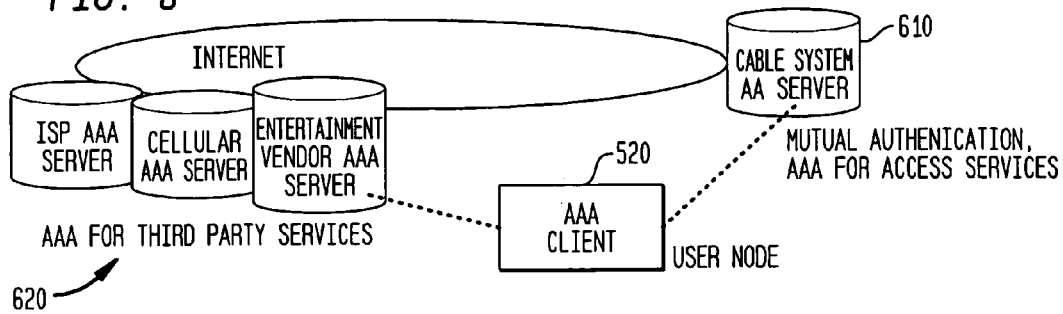
FIG. 6 illustrates transactions among entities in accordance with another aspect of the present invention.

The WLAN client preferably uses an antenna, possibly multi-element involving signal vectors, that is adapted, under headend control, to both transmit to and receive from the superantenna. The radiation patterns may be different for upstream transmission from what they are for downstream transmission. As in most subscriber systems, and aside from mutual authentication between the system and the user node, the AAA functions may be entirely carried out in the headend or delegated in part or whole to the AAA servers of a contractor or third parties. A third party may, for example, be an ISP (Internet Services Provider) established as a virtual operator through agreement with the cable operator. Accounting is arranged such that charges appear on the billing of the virtual operator, who pays the cable operator for services rendered. These interactions are shown in FIG. 6. In particular, FIG. 6 shows AAA transactions between a cable operator 610 and a third party service provider, e.g., a virtual operator, in accordance with a further aspect of the present invention.

Figure 7:
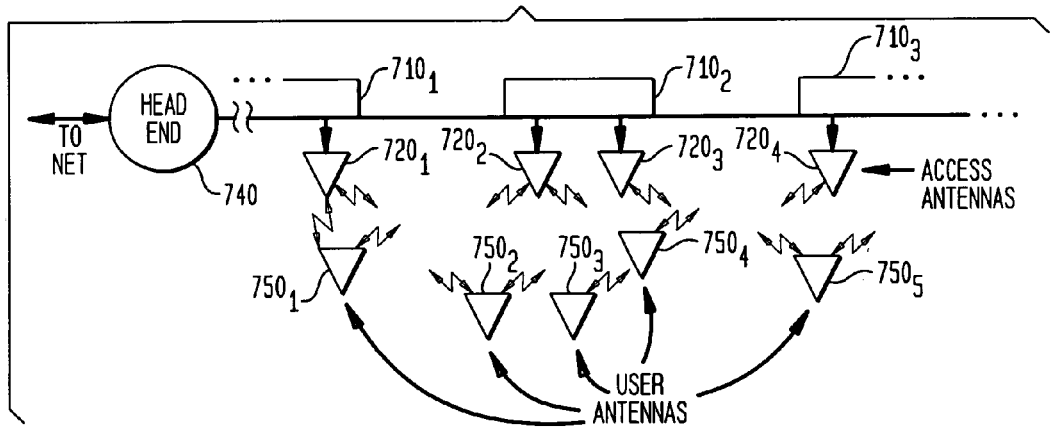
FIG. 7 illustratively depicts a system in accordance with an aspect of the present invention.

In the system discussed above, signals are transmitted between a processor in a central hub or head end and antennas equipped with or connected to transponders that are distributed along a coaxial cable or optical fiber that we refer to as the access line. The system, in accordance with a further aspect of the present invention, may also be depicted as is shown in FIG. 7. The transponders 710 preferably store radiation patterns for the antennas 720, participate in the adaptation process, encode and decode data for line transmission, act as a surrogate for the head-end 740, and perform other functions. The access antennas 720 communicate with user's antennas 750, providing two-way communication capabilities, possibly asymmetric, for each of the users. In this connection, several antennas can communicate with a single user and several users can link to a given antenna on the access line 760.

In the remaining disclosure, a mathematical framework is described illustrating further aspects of the present invention including a method for communicating between each user and the system hub without interference from or to other user's channels in both directions of transmission. In both downstream and upstream transmission, the user preferably specifies the information capacity that is required and the system optimizes by minimizing the power used to achieve that capacity. For example, in accordance with this aspect of the present invention, a method is provided that uses adaptation of the antenna excitation patterns at the transmitters and matching patterns of tap gains on receiver filters to provide relatively efficient interference-free transmission. The other methods of multiplexing, discussed above, may be overlaid on the system described herein if so desired.

If multi-element antennas are used, the separation between elements on the same antenna may be far smaller than the distance between any transmitter array and any receiver array. Consequently, the gain between a transmitting element and a receiving element on the same antenna pair may be essentially constant for all such element pairs. This effectively means that the multi-element antennas may be considered as approximating phased arrays. Adaptation of the excitation of the transmitter antenna element gains may thus be viewed as radiation beam-forming by the transmitting multi-element antennas with corresponding variation of directivity at a receiving array. However, the degree of separation of different users' channels using beam-forming may be inadequate using only one transmitting and one receiving antenna. In accordance with the various previously discussed aspects of the present invention, multi-element antennas are preferably used on both the line and at the user's premises. In addition, all line antenna/user antenna pairs adapt to form a one dimensional (scalar) channel between them as is discussed below. Preferably, each line antenna will be involved in several such adaptations as will each user antenna. Thus, each line antenna radiates a multi-dimensional transmission vector, one component for each of the eigen-beams that it has adapted to. The eigen-beams are formed by an array of filters in the transmitter (or by equivalent signal processing). Data is transmitted as modulation of inputs to these filters. The transmitted line vector is then an outer product of the vectors thus formed at each of the line antennas. In upstream transmission, the converse is true. Each line multi-element antenna is suitably tuned to several transmitting user antennas to form an eigen-beam with each. This tuning is achieved by an array of filters at the input to the line receiver. The output of this beam-forming array is considered the input to the line receiver. The same considerations apply to the users' receivers. The input to the receiver is considered to be the output of the eigen-beam-forming filter array and the transmitted vector is the input to the filter array used to create eigen-beams with the line antennas. Accordingly, then, transmission and receiver vectors thus refer to the inputs of beam-forming filters and the outputs of beam-forming filters.

To overcome interference, an aspect of the present invention is a system that uses cooperation between the antennas attached to the access line under the control of a head-end processor and with the mediation of smart transponders at each access antenna. This cooperation permits the formation of controllable received signal vectors at each user's antenna. This is similar to the multi-cell (cooperating base stations) MIMO model, using in the downstream direction, dirty paper coding (DPC) in an iterative fashion to generate the superposed signals that are transmitted to users. In one aspect, the proposed system differs, however, by avoiding an iterative coding procedure with its sensitivity to the accumulation of small errors. Other differences are that the proposed system preferably uses what may be called two-layer beam-forming, optimization of privacy by eliminating all but the intended signal at a given user's receiver, and user specified transmission rates with minimization of total power transmitter to all users. A variant of DPC is used only to minimize interference at reception instants other than the intended information reception times, i.e., off-cursor interference.

The system preferably interfaces a larger outside network that supplies data to and accepts it from the system, for example, in FIG. 1. Data transfers may also take place between the system and mobile transceivers randomly and dynamically distributed relatively near the system, e.g., pedestrian end-user 136 or a care, mobile radio, etc. Such mobile transceivers will be treated as users by the system. The head-end preferably does all central processing of signals as well as system control and administration.

Figure 8:
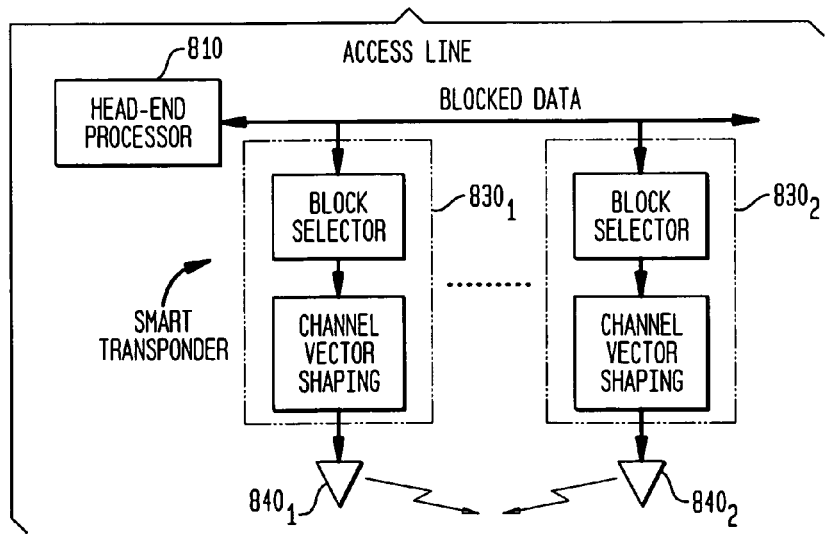
FIG. 8 illustratively depicts a system in accordance with an aspect of the present invention.

The general way that the system works in downstream transmission, illustrated in FIG. 8, is as follows for a single user: (1) Data arrive from the network connection in packets addressed to specific users at the input to a processor 810 at the head-end. The processor accumulates packets for each user until it has a sufficient amount of user data for the computation of sets of cooperative radiation patterns for the antennas distributed along the access line; (2) Each cooperative set of radiation patterns for a given radiation event is encoded into a set of data blocks. Each of these data blocks is addressed an access line transponder 830. It is not necessary for the data blocks to have end-user address information in them, since the radiation pattern itself will deliver each data block to the correct user destination; and (3) Each transponder converts each data block that it receives into radiation patterns for antennas 840 that it serves to be radiated at a time specified in the block. The separate access line antennas radiate at approximately the same time. This happens for each set of radiation patterns, which events occur at periodic intervals.

Figure 9:
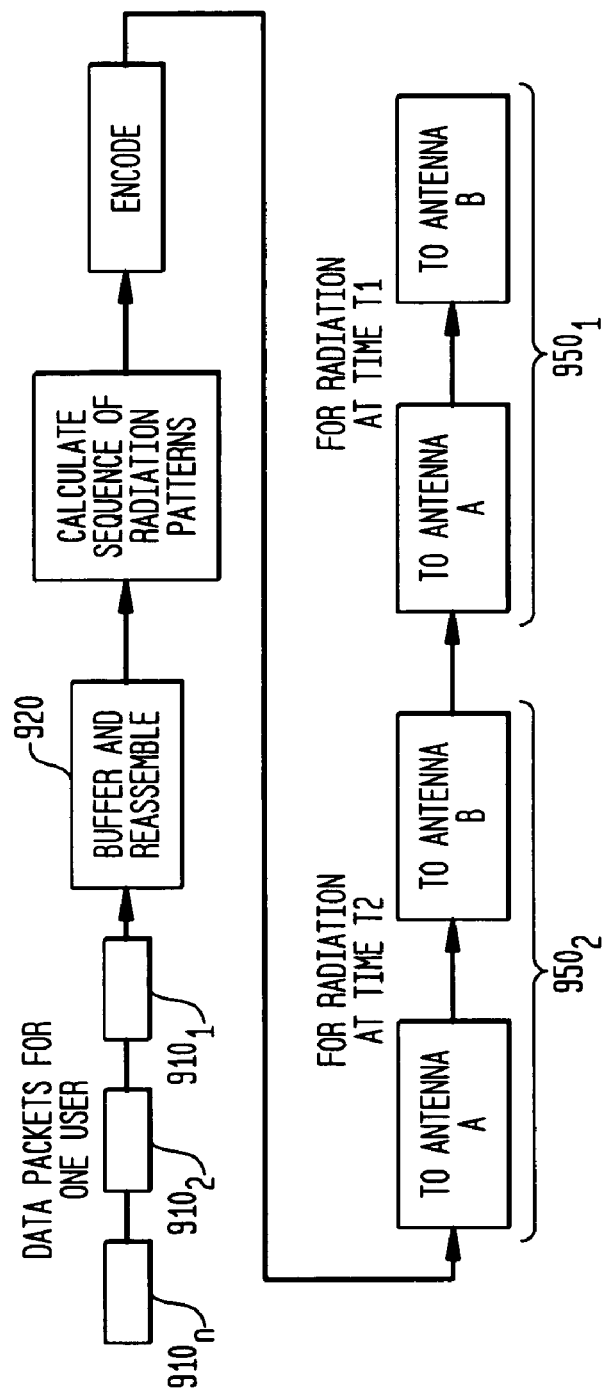
FIG. 9 illustratively depicts a process flow in accordance with an aspect of the present invention.

The processing involved in converting incoming data packs addressed to a single user into a sequence of data blocks addressed to two antennas is illustrated in FIG. 9. As FIG. 9 shows, data packets for a user, 910 are buffered and reassembled at block 920. One or more sequences of radiation patterns is then calculated 930. The sequence is then encoded, 940, and radiated at different time periods, 950.

Where multiple simultaneous users are concerned, processing proceeds as follows: (1) When several users are being serviced, as is typically the case, the packet sequences for each user enter the head-end processor, where the data for each user is converted into a sequence of sets of cooperative radiation patterns from the distribution antennas along the line. The processor then, for each access line antenna, superposes the radiation patterns for the different users; and (2) Each of the superposed radiation patterns is encoded into a block of data and addressed to the appropriate transponder. The block then has information that is intended for several end users in the form of superposed radiation patterns. When the transponder receives the block, it converts the data in the block back into a radiation pattern which is radiated in concert with the other access antennas. This takes place for all sets of patterns in the sequences for all end users. In this way, the whole collection of access line antennas is used simultaneously to service all end users, e.g., used as a superantenna. However, the end-user receivers do not need to cooperate in this process.

Figure 10:
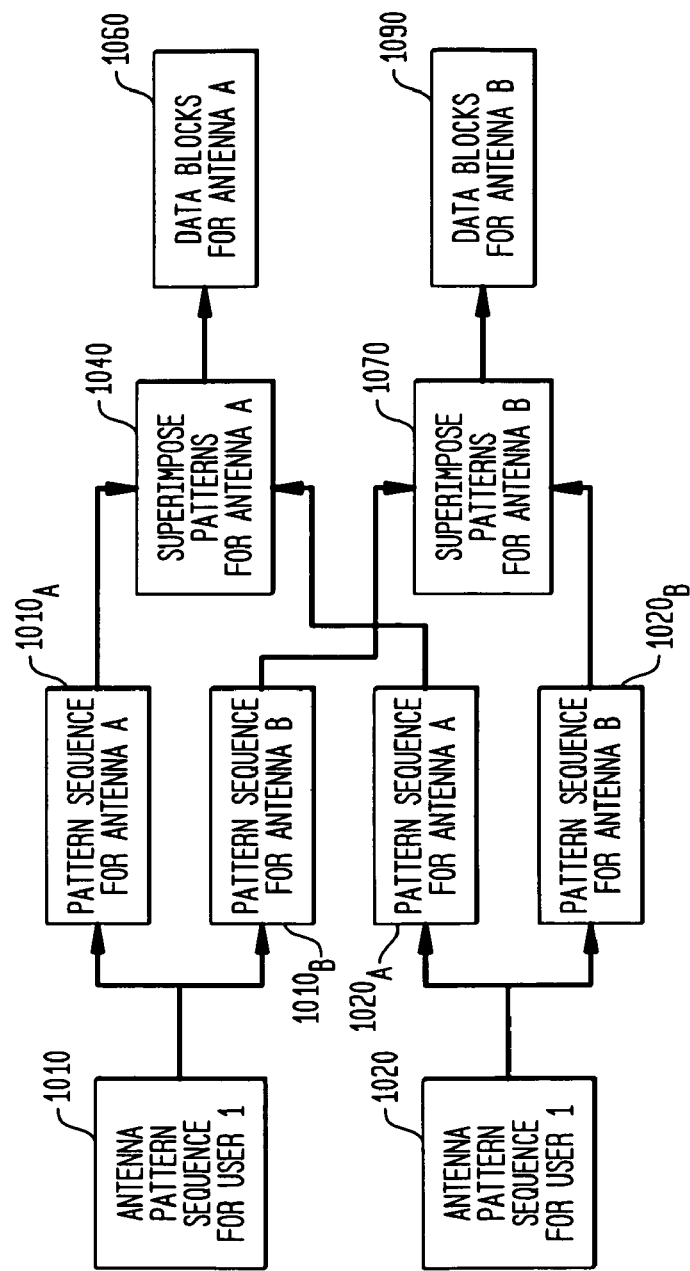
FIG. 10 illustratively depicts a process flow in accordance with an aspect of the present invention.
Figure 11:
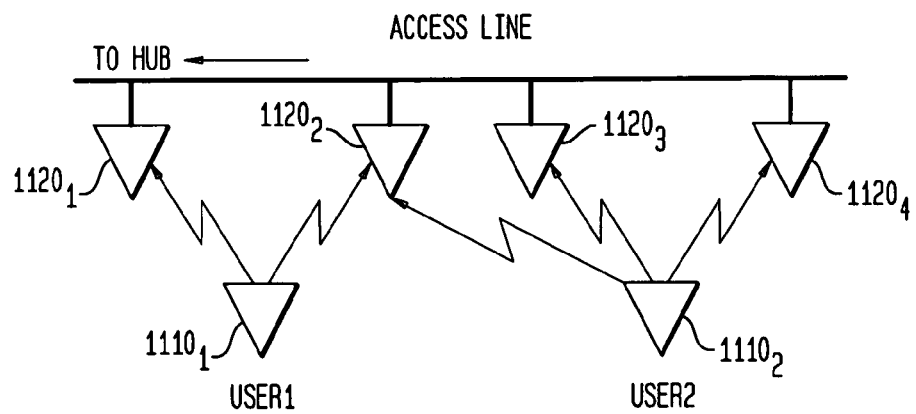
FIG. 11 illustrates a system in accordance with an aspect of the present invention.

The process involved in converting the desired sequences for all users into one sequence of data blocks to the access line antennas is illustrated in FIG. 10 for two users and two antennas. As FIG. 11 shows, antenna pattern sequences for user 1, 1010, and user 2, 1020, are prepared. Each user's pattern sequence, 1010 and 1020, is further processed to form pattern sequences for antennas A and B, blocks 1010$_A$, 1010$_B$, 1020$_A$ and 1020$_B$ as shown. The pattern sequence for antenna A for each user is then superimposed at block 1040 to form data blocks 1060 for Antenna A. The pattern sequence for antenna B is then superimposed at block 1070 to form data blocks 1090 for antenna B. The data blocks are then used to create radiation vectors for the antennas such that each user, whose receiver is adapted to nullify information not intended for that user, respectively receives only the information intended for that users.

Upstream transmission for two users is illustrated in FIG. 11; transponders are not shown in the interest of simplicity of illustration. In upstream transmission, the user's antenna, 1110, and 1102, radiates a pattern that is guided by an adaptation driven by the head-end (not shown in FIG. 11). There is no cooperation between users' transmitters but the adaptation of the individual transmitters with the collection of access line antennas 1120 preferably take all of the individual users' channels into account when adapting each user.

Data arriving from the outside network in packetized form addressed to the end users of the system. It is then prepared for transmission on the fiber/coax transmission line (hereinafter "the line") to transponders that have antenna radiation patterns stored and are distributed along the line. Each transponder serves one or more antennas. The antennas may be multi-element or single element; there is not a one-to-one correspondence between end user receivers and antennas connected to the line. We generally refer to the collection of antennas connected to the line as the "super-antenna". Excitation of each line may be represented as a vector, each component of which is the excitation of a single element of the antenna connected to the line at a given transmission instant. Information may be conveyed in short sequences of simultaneous excitations of the elements of the line antenna, allowing for space-time encoding. These sequences of excitations may also be considered as a transmission vector, which includes sequences of length one.

Selectivity of different users is achieved by different super-antenna excitation vectors, which are specific to users and whose components are stored in the transponders. The antennas that are distributed along the line may be of a variety of types, but it may be assumed that each is a multi-element antenna. This will permit beam forming to each of the separate end users that a given antenna serves. Given the expected radio frequencies, antenna sizes, and distances from the line to the user, there may be only be one significant combination of multi-element antenna element excitation profile and receiver characteristic for each line-antenna/user-antenna pair, as illustrated below. However, the combination of several beams impinging on a given user from different multi-element antennas on the access line provides the opportunity for the creation of several separate sub-channels to each user, distinguishable by distinct receiving antenna profiles, which may be used in concert as developed herein to achieve optimum performance.

Because the system's transmitting antenna elements and receiving antennas are distributed in space, simultaneous transmission or reception events is generally considered a relatively complex process. If a signal was transmitted from all of the line antenna elements simultaneously, its effects would arrive at any given user's receiver as a sequence; further, the sequence would not be synchronized to the receiver's clock because receivers may be distributed over a relatively large geographical area. This effect is compounded by the fact that data that is transmitted by the head-end arrives at different times at different transponders. Of course, the transponders could be programmed to energize line antenna elements at any time considered desirable. However, a collection of transmission times for one user's reception would not be so for another's because of the randomly distributed user's antennas. To be definite, all of the line antennas are generally considered to transmit at the same time and the receivers are preferably buffered for optimum reception.

Data that arrives at the head-end for distribution to users is buffered at the head-end and converted to line antenna transmission vectors for the destined users. In this context, a line transmission vector is a collection of transmission vectors of each multi-element antenna on the line. The head-end superposes these excitation patterns so that the line antenna radiates to all users simultaneously. Individual users have transceivers that are 'tuned' to the excitation designed for them in a way described in the context of this paper. This symbiotic design of the transmission pattern and receiver tuning eliminates all simultaneous interference between signals that are simultaneously transmitted to different users. Further details of how this is done are given below. In this process, each user interacts with the head-end through the line antennas without any user having any information about other individual users.

Downstream Transmission to One User

This section discusses determination of the downstream capacity of the sub-channel between the line antenna and one user's receiver without regard to interference with other users' channels. Determination of line transmission vectors that will cause one user's receiver to be excited without simultaneous interference with other users' sub-channels is also discussed. Determination of the transmission vectors that will provide specified capacities to each user, without simultaneous interference between different users' sub-channels, while minimizing the total transmitted power is also discussed.

Before going into a detailed analyses, recall that each antenna pair formed by a line multi-element antenna and a user's multi-element antenna adapts to form a one-dimensional (scalar) channel. This adaptation is achieved by adjusting an array of filters, or equivalent signal processing prior to transmission in the transmitter and adapting an array of filters, or equivalent processing, after antenna reception in the receiver. The transmission data vector is, then, the array of inputs to beam-forming filter array in the transmitter, and the received vector is the array of outputs of the beam-forming filter array in the receiver. On the line side, the transmission and reception vectors thus spread across several multi-element antennas and on the users side they typically would exist in only one multi-element antenna. Any user can have, however, more than one multi-element antenna to improve capacity or reliability.

The dimensionality of the overall downstream transmission space to all users is therefore typically greater than the number of multi-element antennas on the line. Also in downstream transmission, the dimensionality of the receiver space may be typically less than the number of elements in the user's multi-element antenna. This excess dimensionality might be used for noise cancellation, particularly for spatially colored interference from external sources, as discussed later. Such noise cancellation can also be applied, for the same reason, in the upstream direction.

Even if noise cancellation is employed, noise in the receiver space may be spatially colored in the receive space. We assume that the receiver spatially pre-whitens this noise in the receiver space by a noise whitening filter bank following the beam-forming bank, or by using equivalent signal processing. We further assume that the noise power is unity so that the spatial noise covariance matrix is a unit matrix.

The effect of all of the above assumptions is that the model for downstream transmission to one user is $$r^k = C^k t + n$$

where $r^k$ is the received vector output of the $k^{th}$ user's spatial pre-whitening filter when the line transmission vector is t and the noise, which is spatially white, is $n$. The channel matrix to the user is $C^k$. The channel matrix acts only on the transmission vectors of those line antennas that affect the user's antenna in question, so that it is a square matrix. The noise that appears at the input to the receiving antenna will include intra-system interference as well as interference from sources outside of the system that may be directional. Consequently, this noise appearing on different elements of the receiving antenna may be correlated, so that the received noise would be spatially correlated. As mentioned above, this correlation is removed by spatial pre-whitening at the output of the beam-forming filter bank in the receiver. This can be accommodated for theoretical purposes by assuming that the channel matrix for a given user includes a spatial pre-whitening filter. The noise that is equivalently added to the channel output prior to reception is thus spatially white, that is its covariance matrix is a constant times the unit matrix.

In upstream transmission the channel matrix is the adjoint of the downstream channel matrix for each user. However, noise cancellation and spatial pre-whitening may involve the upstream receiver spaces for other users.

The Capacity of One User's Sub-Channel

This subsection develops a formula for the capacity of a MIMO channel. A Singular Value Decomposition (SVD) is employed, but the capacity is not maximized subject to a power constraint, as it usually is because transmission rates will be specified by users. This suggests that the power should be minimized with a capacity constraint, which effectively yields the same capacity/power trade-off for a single MIMO channel.

We will assume that the noise power is unity. This will have no effect on the results.

Denote by $\phi$ the generic vector transmitted by several of the line antennas and by $\psi^k$ the generic reception profile of the $k^{th}$ user's receiver. The relationship between the two, in the absence of noise, is given by $$\psi^k = C^k \phi \qquad (1)$$

For efficient operation of the user's channel, we are naturally interested in those transmitted vectors of unit energy that result in maximal received signal to noise ratio (SNR). Since the noise is spatially white in the received space, the transmitted vector that maximizes the received signal energy (the norm of $\psi^k$) achieves this end. The transmitted vector that produces this result is an eigenvector of the singular value decomposition (SVD) of the channel:

$$(\lambda_n^k)^2 \phi_n^k = \tilde{C}^k C^k \phi_n^k \qquad (2)$$

where subscripts refer to the eigen-solution and superscripts designate the user.

The received vector that is caused by transmitted vector $\phi_n^k$ is $\psi_n^k$ and the signal to noise ratio for the corresponding scalar sub-channel is the eigenvalue,$(\lambda_n^k)^2$. The set of all of the solutions $\{\phi_n^k\}$ of (2) forms an orthonormal basis for the space of transmitted signals for the $k^{th}$ user and the set $\{\psi_n^k\}$ forms an orthogonal basis, with respective norms $\{(\lambda_n^k)^2\}$, for the corresponding space of received signals. The user's sub-channel may thus be represented as a parallel array of scalar (or one-dimensional) sub-channels with received SNR's $\{(\lambda_n^k)^2 (s_n^k)^2\}$ when the transmitted signal power on the $n^{th}$ sub-channel is$(s_n^k)^2$, so that the capacity of the user's channel is $$C^k = \frac{1}{2} \sum_n \log[1 + (\lambda_n^k)^2 (s_n^k)^2] \qquad (3)$$

In (3), the summation is over the scalar sub-channels of the user's sub-channel. The allocation of the scalar sub-channel powers that maximizes the capacity to the user will not be determined here because the capacity is specified by each user and because the signals intended for different users are, in their present form, coupled. However, the system optimizes each user's channel by minimizing the power that is transmitted to achieve the specified capacity without cursor-time interference, which we define as interference from signals that were transmitted to other users at the same time as the signal intended for the $k^{th}$ user. Off-cursor interference is defined as interference due to signals that are intended for other users that are transmitted at times other than the transmission time of the intended signal. Off-cursor interference can occur because of the different propagation times from different line antennas and because of scattering. Note that off-cursor interference does not include vector intersymbol interference cause by signals intended for the $k^{th}$ user but sent at a different time.

Signaling Without Cursor-Time Interference

The transmission eigenvectors for the $k^{th}$ user, $\{\phi_n^k\}$, are mutually orthogonal but are not inherently orthogonal to those for other users. However, if the set of all transmission eigenvectors for all users forms a linearly independent set, they can be used as a basis set for the space of all transmission vectors that are received by at least one user. We will refer to all transmission vectors that affect at least one user's receiver as effective transmission vectors. Mathematically, the set of effective transmission vectors lies in SPAN$\{\phi_n^k\}$, where k ranges over all users and the range of n may among the users.

The essential idea in the following is that any transmission vector that is orthogonal to the space of transmitter eigenvectors of one user will not interfere with that user's reception. Consequently, we want transmission vectors for the $k^{th}$ user to excite reception vectors of that user while being orthogonal to the all of the transmission eigenvectors of all of the other users. Consequently, we seek a set of vectors that are bi-orthogonal the set of transmission eigenvectors for all users.

Since no effective transmission vectors can be orthogonal to all users' transmission eigenvectors, there exist two positive constants, A and B, known as frame bounds, such that for any effective transmission vector, $$A\|f\|^2 \leq \sum_{n,k} (\phi_n^k, f)^2 \leq B\|f\|^2, \forall f \qquad (4)$$

where f is a transmission vector and are. If equality can be achieved in (4), the frame bounds are known as tight bounds. Transmission vectors that do not satisfy (4) are not effective. A collection of vectors satisfying a relation such as (4) is a 'frame'. An excellent reference on frames is Christensen. This concept will now be used to determine transmission vectors that excite only one receiver eigenvector without any simultaneous interference to any other receiver scalar sub-channel for any user.

To that end, consider the operator T, which operates on transmission vectors, defined by $$Tf = \sum_{n,k} \phi_n^k (\phi_n^k, f) \qquad (5)$$

Because of (4), T is non-singular, so that we may write $$f = TT^{-1}f = \sum_{n,k} \phi_n^k (\phi_n^k, T^{-1}f) \qquad (6)$$

-continued
$$= \sum_{n,k} \phi_n^k(T^{-1}\phi_n^k, f) = \sum_{n,k} \phi_n^k(\upsilon_n^k, f)$$

where we have implicitly defined the set of dual vectors, $\{\upsilon_n^k\}$, and have used the definition of the adjoint of an operator and the fact that T is obviously self-adjoint We may also write $$f = T^{-1}Tf = T^{-1}\sum_{n,k} \phi_n^k(\phi_n^k, f) = \sum_{n,k} \upsilon_n^k(\phi_n^k, f) \quad (7)$$

Comparison of (7) and (6) gives justification to the application of the term 'dual' to the set $\{\upsilon_n\}$.

We now determine a set of transmission vectors, $\{\theta_n^k\}$, such that each will excite one receiver eigenvector, say $\{\theta_n^k\}$, and no other. In order that this must be true, we must have $$(\theta_m^j, \phi_n^k) = \delta_{mn}\delta^{jk} \quad (8)$$

where $\delta_{mn}$ and $\delta^{jk}$ are Kronecker deltas, so that $\psi_n^k$ is excited but no other receiver eigenvector is. Using the expansion given by (7), noting that $\{\phi_n^k\}$ is a basis for the space of effective transmission vectors, and incorporating (8) then yields $$\theta_n^k = \upsilon_n^k \quad (9)$$

The frame $\{\upsilon_n\}$ is thus bi-orthogonal to the frame $\{\phi_n^k\}$ and the $\{\upsilon_n^k\}$ are a suitable set for signaling, without cursor-time interference, to the separate receiver scalar channels.

Efficient Signaling

The way to use the $\{\upsilon_n^k\}$ to provide all of the users' specified capacities while minimizing the total transmitted power will now be determined. Note that this is the converse of the usual procedure of maximizing capacity with a constraint on transmitted power. In the case of a single user, the two approaches yield the same relationship between transmitted power and capacity. However, this typically will not be so in our case as we typically minimize we seek to minimize the total power to all users with user specified capacities, so that we will have multiple constraints (capacities) in a single optimization. To do this, first note that the total transmitted signal vector from all access line antennas to all users' receivers is $$S = \sum_n \sum_k \alpha_n^k \upsilon_n^k \quad (10)$$

where the $\{\alpha_n^k\}$ are the random user data values (scalars) to be set; they form an uncorrelated zero-mean set. The total power transmitted is thus $$P = \langle S, S \rangle = \sum_k \sum_n (s_n^k)^2 \|\upsilon_n^k\|^2 \quad (11)$$

where the angled brackets indicate mathematical expectation and $(s_n^k)^2 = \langle (\alpha_n^k)^2 \rangle$ is the power transmitted on the $n^{th}$ sub-channel of the $k^{th}$ user's channel.

The optimization problem that must be solved is the minimization of (11) subject to the constraints expressed by (3). An appropriate objective function to achieve this objective is $$F = \frac{1}{2}\sum_k \sum_n (s_n^k)^2 \|\upsilon_n^k\|^2 + \sum_k (\mu^k)^2 \left[ C^k - \frac{1}{2}\sum_n \log[1 + (\lambda_n^k)^2 (s_n^k)^2] \right] \quad (12)$$

where the $\{\mu^k\}$ are a collection of Lagrange parameters. Note that the second pair of summations is not interchangeable.

To optimize, differentiate F with respect to $s_n^k$ and set the result equal to zero to get $$s_n^k \left[ \|\upsilon_n^k\|^2 - (\mu^k)^2 \frac{(\lambda_n^k)^2}{1 + (\lambda_n^k)^2 (s_n^k)^2} \right] = 0 \quad (13)$$

One solution to the equation (13) is to set $s_n^k = 0$; in that case the $n^{th}$ scalar sub-channel of the $k^{th}$ user's channel is not used. We will come to the reasons for doing this below. The alternative solution is to set the bracketed quantity in (13) equal to zero, which leads to $$\log[1 + (\lambda_n^k)^2 (s_n^k)^2] = \log(\mu^k)^2 + \log\frac{(\lambda_n^k)^2}{\|\upsilon_n^k\|^2} \quad (14)$$

Summing both sides over the functioning scalar channels, i.e., over those n for which $s_n^k > 0$, and applying the constraint expressed by (3) yields the Lagrange parameter:

$$\log\mu^k = \frac{C^k}{M^k} - \frac{1}{M^k}\sum_{n=1}^{M^k} \log\frac{\lambda_n^k}{\|\upsilon_n^k\|} \quad (15)$$

where $M^k$ is the number of active scalar sub-channels that the $k^{th}$ user actively employs. In writing (14), we assume that the scalar sub-channels are sequenced in order of decreasing values of $$\lambda_n^k / \|\upsilon_n^k\|.$$

Using this result in (14) yields $$\log\left[1 + \lambda_n^{k2}(s_n^k)^2\right] = \frac{C^k}{M^k} + \log\frac{\lambda_n^{k2}}{\|\upsilon_n^k\|^2} - \frac{1}{M^k}\sum_{m=1}^{M^k} \log\frac{\lambda_m^{k2}}{\|\upsilon_m^k\|^2} \quad (16)$$

or, $$\log\left[1 + \lambda_n^{k2}(s_n^k)^2\right] = \frac{C^k}{M^k} + \log\frac{\lambda_n^k}{\|\upsilon_n^k\|} - \frac{1}{M^k}\sum_{m=1}^{M^k} \log\frac{\lambda_m^k}{\|\upsilon_m^k\|} \quad (17)$$

It should be note that (17) presents a problem similar to that which occurs when maximizing the channel capacity of a single channel for a given transmitted power, i.e., if $M^k$ is too large the right-hand side of (17) will be negative for larger values of n, implying that the argument of the logarithm on the left is less than one. This in turn would imply that $\lambda_n^{k^2}(s_n^k)^2$ is negative, which is typically considered absurd.

At this point, we can solve (17) for the power on each of the scalar sub-channels that is required for the minimum power supplied, for arbitrary channel capacity. This is the approach that is necessary when the required capacity is so great that all of the available scalar sub-channels must be used. However, if this is not the case, i.e., if some of the scalar sub-channels are not used, the expression for the sub-channel power takes a particularly simple form for a certain discrete set of channel capacities. With this is mind, suppose that (17) gave the value of zero for the power on the $(M^k)^{th}$ sub-channel when it was assumed that $M^k$ would be used. Then, the right hand side of (17) would be zero for $n=M^k$, so that the channel capacity would be $$C^k = -M^k \log \frac{\lambda_{M^k}^k}{\|v_{M^k}^k\|} + \sum_{m=1}^{M^k} \log \frac{\lambda_m^k}{\|v_m^k\|} \quad (18)$$

Using this result in (17) yields $$\log\left[1 + \lambda_n^{k^2}(s_n^k)^2\right] = \log \frac{\lambda_n^k}{\|v_n^k\|} - \log \frac{\lambda_{M^k}^k}{\|v_{M^k}^k\|} \quad (19)$$

This yields, for the power transmitted on the $n^{th}$ scalar channel, $$\|v_n^k\|^2 (s_n^k)^2 = \frac{\|v_{M^k}^k\|^2}{(\lambda_{M^k}^k)^2} - \frac{\|v_n^k\|^2}{(\lambda_n^k)^2} \quad (20)$$

The total power transmitted to the $k^{th}$ user would then be $$P^k = M^k \frac{\|v_{M^k}^k\|^2}{(\lambda_{M^k}^k)^2} - \sum_{m=1}^{M^k} \frac{\|v_m^k\|^2}{(\lambda_m^k)^2} \quad (21)$$

At this point it should be noted that the relevant equations for the scalar sub-channels' transmitted powers can always be put in this generic form. Suppose, for example, only $M^{k-1}$ sub-channels were available for use because the validity of (17) would be violated if using $M^k$ were attempted. We could then invent an artificial added sub-channel such that (18) was satisfied. Since this 'artificial sub-channel' would never be used, it is an irrelevance. Hence, we may think of (20) and (21) as being generally true.

Intersymbol Interference and Crosstalk

The preceding section developed the technique for transmitting to users of the system without cooperation among them and without simultaneous interference between their channels. However, the developed techniques ignored coupling between user's sub-channels at reception times that are offset from that which was intended at the transmitter. We will call this time-offset interference 'crosstalk' except when the interference is into the intended user's channel, when it is intersymbol interference. Intersymbol interference can be eliminated by using vector decision feedback equalizers at each user's receiver, and will not be discussed further. This section therefore focuses on crosstalk reduction.

There are three methods of crosstalk reduction that are discussed. One of them requires knowledge of the crosstalk coupling matrices to all users for each line transmitter function that is employed. This would be a great deal of data that must be accumulated by the head-end by feedback from users' receivers in the training mode of each user, except for the fact that each user is probably detectably influenced by relatively few of the antennas on the access line and the time sequence of interfering signals from any of them is probably of very limited duration, e.g., one or two time slots removed from the original reception. The three methods of interference reduction are:

A. Crosstalk cancellation at the receiver.

B. Using noise pre-whitening to force the user's channels to compete with each other for resources.

P C. Transmitting a crosstalk cancellation sequence after information transmission.

The first two of these techniques do not require any direct action by the transmitting line antenna, each receiver minimizing its interference based on measurements of its own noise environment. As mentioned above, the third technique requires that the transmitting line antenna has knowledge of the crosstalk coupling matrices and hence requiring substantial data gathering through a feedback link from each receiver to the head-end. Each of these techniques will now be discussed.

Crosstalk Cancellation at the Receiver

Crosstalk cancellation at the receiver in the current context assumes that each user's receiver has the capacity to receive signals that are of greater dimensionality than those that are used in direct transmission from the line. The adaptation of the line-transmitter/user receiver pair that results in a decomposition of the user's channel into a set of parallel, uncoupled, scalar channels will leave some of the potential dimensions of the user's receiver unemployed. Thus, there will be a subspace of the user's space of potential received signals that is not used for information reception. However, transmission intended for other users at another time may influence this 'null subspace' as well as the information subspace for the receiver. The crosstalk components in the two receiver sub-spaces will be correlated, so that traditional linear noise cancellation can be employed to reduce the noise in the crosstalk components in the information subspace for the receiver. The methodological details of achieving such cancellation are well known and will not be considered here.

It should be noted that decomposing the user's channel from the line antenna uses noise pre-whitening to determine the best scalar channels to use. Part of the noise that is pre-whitened is crosstalk, so that crosstalk cancellation is achieved in the initial channel structuring into scalar sub-channels. However, this process consumes upstream feedback channel capacity and alters the transmission vectors for the user being adapted. On the other-hand, crosstalk cancellation between channel realignment periods, that reduced crosstalk in the information reception space of the receiver after initialization, would not require feedback and would not cause transmission vector variation. Such cancellation could handle dynamic variation of all interference characteristics, not only crosstalk.

Noise Whitening as a Means of Crosstalk Minimization

We have shown how an individual user's channel can be adapted to avoid cursor-time crosstalk and achieve a given capacity with minimum power transmitted by the access line antenna. Responses at the user's antenna due to transmissions intended for that user at other than transmission times can be eliminated by a generalized DFE. But, as mentioned above, this leaves the crosstalk from non-simultaneous transmissions (off-cursor crosstalk) from other users as residual interference contributing to the total noise environment at the user's receiver input. This residual interference comes from sources unknown to the user's receiver so that it will be treated by the receiver as noise and its correlation properties can be estimated by the receiver. In the adaptation process, the residual interference will thus result in affecting the modification of the channel model and receiver structure that is used in adaptation of the transmission excitation set and receiver characteristics.

It should be noted that the excess dimensionality of the receiver, mentioned above, is important in this context. In spatially pre-whitening noise in the larger than required receiver space, the receiver effectively employs noise cancellation between the active and null subspaces of the receiver space. However, as mentioned above, this requires considerable upstream overhead capacity. In the interest of efficient system operation, then, spatial pre-whitening of noise in the larger than required receiver space would occur only at start-up and at infrequent clean-up adaptations. Cancellation of noise changes that occurred since the last clean-up adaptation would be employed for normal tracking adaptation.

Transmitting Crosstalk Cancellation Sequences with Information Sequences

It is possible to transmit a sequence of vectors from the line antenna in addition to the sequence intended to convey information into order to cancel off-cursor interference between different user's channels. We have established that there is a set of line antenna vectors, $\{\upsilon_n\}$, that lead to the reception of eigenvector received vectors, $\{\psi_n\}$, without simultaneous interference. The superscript designating the specific user has been suppressed in this notation. These two quantities are related by $$\psi_n = \frac{C(0)\upsilon_n}{\|C(0)\upsilon_n\|} = \frac{C(0)\upsilon_n}{\lambda_n} \tag{22}$$

when the $\{\psi_n\}$ are appropriately normalized and C(0) is the channel operator. They are orthonormal:

$$(\psi_n, \psi_m) = \delta_{mn} \tag{23}$$

It should be emphasized that C(0), as used in this section, is the effective channel operator. The transmission space for this operator is only those line excitations that are used by the end-users. Those excitations that incur too much loss in transmission, as determined above, are outside of the domain of C(0).

Now, let C(k) be the channel operator when there is a time offset of k, i.e. if the line antenna excitation vector at time zero is $\phi$, then the outer product of all of the vectors received by all users' transmitters is $C(k)\phi$. C(0) is thus what we have called the channel operator above.

The scalar crosstalk received in the $n^{th}$ scalar channel, at time zero, from the transmission at time −k is thus $(\psi_n, C(k)\phi(-k))$, where $\phi(-k)$ is the line excitation at time −k. This scalar crosstalk can be pre-cancelled if the line antenna excitation at time zero is augmented by $$-\frac{\upsilon_n}{\lambda_n}(\psi_n, C(k)\phi(-k)).$$

Summing over all times and all receiver channels, post-cursor interference can be eliminated at time zero if the line excitation for information transmission is augmented by $$-\sum_{k=1}\sum_n \frac{\upsilon_n}{\lambda_n}(\psi_n, C(k)\phi(-k)) \tag{24}$$

If the set of information scalars to be transmitted at time zero is $\{s_n\}$, the total line excitation at time zero that pre-cancels crosstalk and transmits the information $\{s_n\}$ is thus $$\phi(0) = \sum_n \left[ s_n - \sum_{k=1} \frac{(\psi_n, C(k)\phi(-k))}{\lambda_n} \right] \upsilon_n \tag{25}$$

If we write the line excitation for the information to be transmitted at time zero as a vector S(0) and observe that $$\sum_n \frac{\upsilon_n \tilde{\psi}_n}{\lambda_n} = C^{-1}(0) \tag{26}$$

where the tilde indicates the transpose and the singular value decomposition of C(0) has been used, (25) may be written in the form $$\phi(0) = S(0) - \sum_{k=1} C(0)^{-1} C(k)\phi(-k) \tag{27}$$

Figure 12:
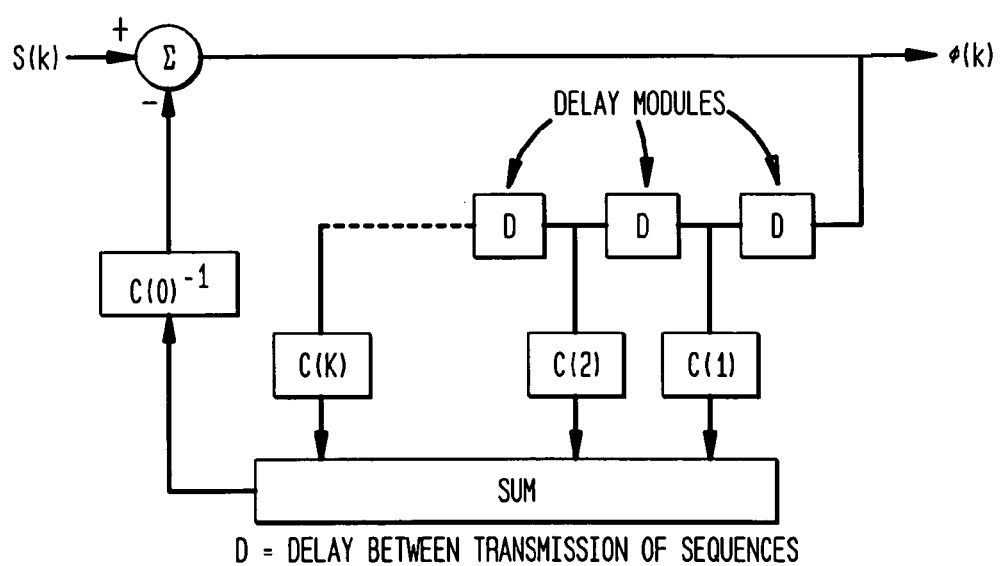
FIG. 12 is a functional illustration of a filter in accordance with an aspect of the present invention.

This equation is of the generic form of generalized feedback filter as shown in FIG. 12.

In effect, the filter in FIG. 12 thus creates the inverse of the transmission operator between the distribution line antennas and a receiver antenna on the space of possible desired received sequences. As mentioned above, the spectrum of the transmission operator can contain very small eigenvalues when the number of antenna elements is large or when there is significant intersymbol interference (ISI). This implies that the transmitted power will become large when the filter in FIG. 12 is used. This is similar to the problem that occurs when trying to pre-cancel intersymbol interference at a transmitter instead of using a decision feedback equalizer. This problem can be alleviated in the current instance by using modulo arithmetic.

Figure 13:
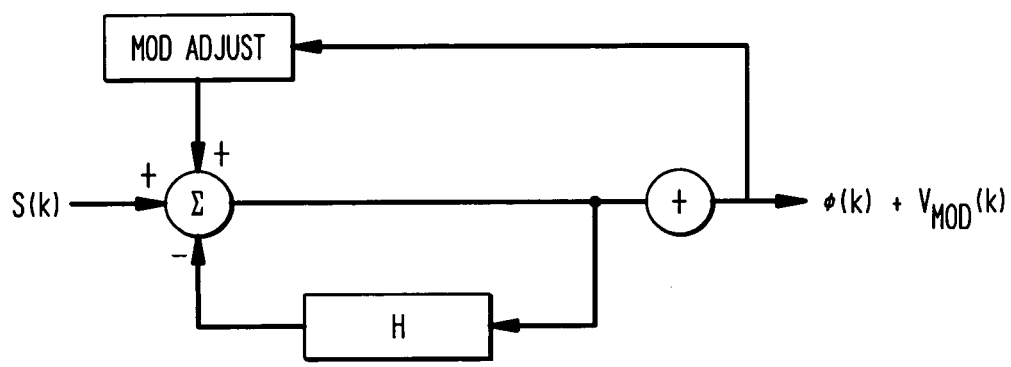
FIG. 13 is a functional illustration of a filter in accordance with an aspect of the present invention.

This technique takes advantage of the fact that each of the vectors in the sequence of vectors radiated to each user will be quantized with a maximum and a minimum scalar value in each component. Hence one can add a vector with components equal to the integral multiple of the maximum (or minimum) size in each dimension of the vectors in the sequence destined for a given user; call the added vectors in such a sequence $V_{MOD}$. Note that since the sequence intended for one receiver's antenna because of the filtering discussed above, the sequence that is modified by adding $V_{MOD}$ will also be non-zero only at the same user's receiver and at no other. Consequently, the receiver in question can determine $V_{MOD}$ from its received sequence and subtract it from the total received sequence. This is done merely by subtracting that $V_{MOD}$ which brings each vector in the received sequence within the range of possible received vectors for that user. Thus, the added modulo sequence can be extracted without any knowledge of what is received by other users. The sequence $V_{MOD}$ should be chosen to minimize the total transmitted power. This can be done by choosing the individual vectors in the $V_{MOD}$ sequence to minimize the instantaneous transmitted power. The filter in FIG. 12 can thus be modified so that the transmitting filter uses modulo addition controlled by a feedback link from the filter output as shown in FIG. 13 which combines the modulo addition for all users' channels. The sequence added to the input information sequence is chosen to minimize the transmitted power. In FIG. 13 the feedback segment of the filter is the same as that shown in FIG. 12

Figure 14:
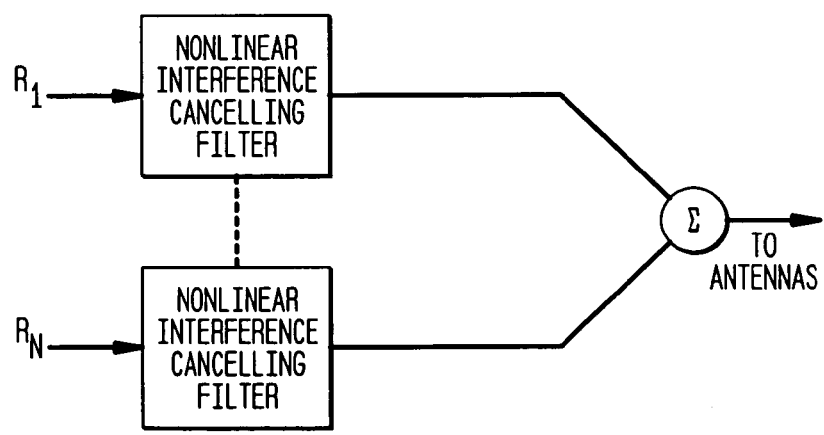
FIG. 14 is a functional illustration of a filter in accordance with an aspect of the present invention.

Of course, each user preferably have a different non-linear filter, as shown in FIG. 13 and corresponding nonlinear receiver. These filters, for all of the users, may be combined as shown in FIG. 14 in preparation for transmission.

Upstream Transmission

Upstream transmission between a user's antenna and the access line is generally different from downstream transmission. The reason for this is that, in the interest of relative simplicity of user signal processing and of privacy, each user maintains only the transmission matrix to the access line from his/her own antenna to the receiving super-antenna connected to the access line. That is, no user stores the channel matrix of other users, so that the users do not cooperate. Such information would be necessary for a given user to design transmitted vectors that avoided interference. In addition, the data on transmission and processing to suppress it is more easily accommodated at the head end of the system. Consequently, the task of crosstalk cancellation is relegated to the head-end processor. However, all of the separate users' upstream transmission matrices are available at the head-end processor that will optimize each user's upstream transmission. The set of optimal transmission vectors for each user is thus determined by the head-end and transmitted downstream to the user. To summarize this discussion, in downstream transmission transmitters cooperate and receivers do not, while in upstream transmission, transmitters do not cooperate, but receiving antennas do, being part of the line super-antenna.

The first step in upstream transmission design is the selection of the transmitted vectors. In order to do this, the user's transmitter can be trained with the aid of processing by the head end processor. In this process, the user's antenna can transmit each basis vector in its transmit space in turn and the time-space macro-vector signal that is received by the access line super-antenna can be recorded. The head-end computer can then determine the set of transmitted vectors and the power distribution among them that would maximize the capacity of the consequent upstream channel for that user. Thus, each user would have a preferred set of vectors and power distribution among them that would provide the information capacity for that user. Even if it is not necessary to transmit at the maximum rate, the determined vector signals would be a good set to use. Considerations such as those discussed above might be used to determine such a 'good' set. However, the corresponding received sets, although comprising orthogonal sets of basis vectors for each user, would not generally be orthogonal between users, as will demonstrated below, so that far end crosstalk would result unless steps were taken to avoid it. This section outlines the steps that must be taken by the hub-end processor to extract signals from one user among many that are transmitting, uncorrupted by signals from other users, even in the presence of such far-end crosstalk.

We can assume that the transmitted vectors and the distribution of power among them are determined using an analysis similar to that given above. Hence, for the $j^{th}$ user, there will be a set of orthonormal possible transmitted vectors that we will indicate by $\{P_j \phi_n^j\}$, where $P_j$ is a projection operator with domain the space of all transmitted vectors from all users' antennas and range the space of possible vectors that can be transmitted from the $j^{th}$ user's antenna. Since the vectors from different users are radiated from different antennas, vectors transmitted by different users will also be orthogonal in the transmission space. This set of vectors maximizes the total energy received in the aggregate of access antennas for a constrained transmitted power by $j^{th}$ user's antenna, and are the solution of the eigenvalue problem $$\lambda_n^j P^j \phi_n^j = P^j \tilde{C} C P^j \phi_n^j \tag{28}$$

where C is the channel matrix between the space of vectors transmitted from all users' antennas to the space of vector sequences comprising the outer product of sequences of vectors received at all access antennas and $P^j$ is a projection operator with domain the space of the outer product of transmit spaces from all users' antennas and with range the transmit space of the jth user's antenna; it is assumed that C includes pre-whitening of the overall noise vector. It should be noted that (28) can be processed at the head-end even though it is user-specific.

Equation (28) is the singular value decomposition eigenvalue problem of the jth user. The optimum number of such vectors that should be used is determined by a level filling argument, as discussed above. The number of such vectors could vary from user to user, but this number might be fixed to something less than the optimum for some or all users in the interest of processing simplicity, as discussed above. Such constant dimensionality of the transmission space with a concomitant standard of capacity can be achieved by controlling the output transmitted power of each user from the head end. Upstream far end crosstalk between users will occur because the set of received vectors corresponding to the set $\{P^j \phi_n^j\}$ will not necessarily be orthogonal to the set of received vectors caused by the set $\{P^k \phi_n^k\}$ for $j \ne k$. (It is in transmission and because of difficulties in synchronization between antennas, as discussed above, that the vectors from different users' antennas are not orthogonal.)

To see this, first denote by $\psi_n^j$ the vector that is received when $P^j \phi_n^j$ is transmitted. Then, the inner product between the vectors received from two different users is $$(\psi_n^j, \psi_m^k) = (CP_j \phi_n^j, CP_k \phi_m^k) = (P_j \phi_n^j, \tilde{C} C P_k \phi_m^k) \tag{29}$$

This equation highlights the fact that the $\{\phi_n^j\}$ are the solutions of a Weiner-Hopf equation:

$$\lambda_m^j = \tilde{C} C P_j \phi_m^j \tag{30}$$

with extension of the vectors $\{\phi_n^j\}$ from the range of $P^j$ to the whole space of vectors received by the conglomerate of access antennas being given by the overall channel matrix. Since the overall channel matrix will be known at the head end processor, it would seem that (30) may be used to cancel far end crosstalk. Although this is possible, it is complex and a different approach is given below.

The sets of vectors received from different users will be linearly independent because the combined upstream transmission singular value decomposition matrix for the overall system, i.e. $\tilde{C}C$, will be non-singular. This assumes that the upstream channel transmission matrix has a domain restricted to the subspace of vectors that are actually used. Consequently, any combination of vectors transmitted from different users can be separated by processing at the head-end. To see how to do this separation, suppose that the set of vectors received by the access line antennas due to signals sent from the $j^{th}$ user is $\{\psi_n^j\}$, where $$\psi_n^j = C^j P^j \phi_n^j \tag{31}$$

and $C^j$ is the upstream transmission matrix between the $j^{th}$ user and the access line antennas. Then the set of $\psi_n^j$, $\forall n,j$, will constitute a frame for the space of signal vectors that are received by the line antenna. Then, for any signal received by the line, say F, there are constants $0 < A \leq B < \infty$ such that $$A\|F\|^2 \leq \sum_{n,j} (\psi_n^j, F)^2 \leq B\|F\|^2 \tag{32}$$

To use this information, define a linear operator T by $$TF = \sum_{n,j} (\psi_n^j, F) \psi_n^j \tag{33}$$

This operator is nonsingular because of (32). It is interesting to note that the constants A and B in (32) are the minimum and maximum eigenvalues in the spectrum of T, and can thus be determined at the head-end processor. Hence we may write, for any F in the space spanned by the $\{\psi_n^j\}$, $$F = TT^{-1}F = \sum_{n,j} (\psi_n^j, T^{-1}F)\psi_n^j = \sum_{n,j} (T^{-1}\psi_n^j, F)\psi_n^j = \sum_{n,j} (\zeta_n^j, F)\psi_n^j \tag{34}$$

where the obvious symmetry of T has been employed and the $\zeta_n^j$ have been implicitly defined. This equation affords a representation of any received signal in terms of the $\{\psi_n^j\}$. It can also be used to determine what the total transmitted signal was that comprises a signal vector from each user. To see this, note that (34) can be used to represent a received signal that is a consequence of transmitting, say, a vector S, so that $$F = CS \tag{35}$$

Note, also that $$\psi_n^j = CP^j \phi_n^j \tag{36}$$

Using (34) and (35) in (31) now yields $$CS = \sum_{n,j} (\zeta_n^j, F) CP^j \phi_n^j \tag{37}$$

Since C, as defined, is a non-singular operator, (10) may be written in the form $$S = \sum_{n,j} (\zeta_n^j, F) \phi_n^j \tag{38}$$

Since the set $\{\phi_n^j\}$ is a complete orthonormal system on the transmitted signal space, the coefficients of the expansion of S are unique. Hence, signal vectors from different users are separated by (38).

As an aside, another way of deriving (38) is to operate on both sides of (8) with $\tilde{C}$, which is the transpose of C, to yield $$S = (\tilde{C}C)^{-1}\tilde{C}F \tag{39}$$

Now, note that $$T = CC \tag{40}$$

which is obviously symmetric, as mentioned above.

In summary, to separate signals transmitted upstream at the head-end, the hub processor must solve the SVD eigenvalue problem for each user's antenna and then determine the frame and dual frame of the received vector spaces. It should be noted, however, that the frame representation does not require that the transmitted signal basis be eigenvectors of the SVD. They can be any linearly independent set of vectors in the transmit space.

Equilibrium of Adaptation

We have shown how an individual user's channel can be adapted to avoid same sequence number crosstalk and achieve a given capacity with minimum power transmitted by the access line antennas. Responses at the user's antenna due to transmissions intended for it at offset sequence numbers can be eliminated by a generalized DFE. But this leaves the crosstalk from transmissions at offset sequence numbers and from other users as residual interference contributing to the total noise environment at the user's receiver input. This residual interference, if not pre-canceled, comes from sources unknown to the user's receiver so that it will be treated by the receiver as noise and its correlation properties can be estimated by the receiver. In the adaptation process, the residual interference will thus result in affecting the modification of the channel model and receiver structure that is used in adaptation of the transmission excitation sequence and receiver characteristics, tending to move the user's channel subspace away from subspaces that contain large interference from other users.

Thus, when a new user starts up, the user's receiver will sense the total noise, including residual interference and the user's channel will adapt accordingly. When the user starts to transmit the other user's noise environment will include the newly added residual interference from the newly started user. This will cause them to adjust their channel settings in order to optimize their performance. This will create another new noise environment for all user's, requiring another adaptation. It is ostensibly possible that this process could produce an instability with all users continually adapting to a continually changing noise environment. This section shows that there is, however, at least one stability point where no user channel's performance can be improved by a slight adjustment of that user's channel characteristics. The equilibrium is a variety of Nash Equilibrium.

We will now formulate a model of the multiple adjustment of all of the user's channel as a formal strategic game.

In this game, each player is constrained to a channel use that constrains the capacity of the channel. The channel model that the user uses is the SVD of the noise pre-whitened channel. Since the head-end knows all of the transmission data for all users, we can assume in the game that, at each reception, the receiver knows what signal was transmitted to all users and knows how this will influence its input. This input is a known noise vector for given transmissions to other users. In addition to this known noise, there is interference and noise from other sources which has statistical properties that the receiver can estimate. The so-called pure strategy for the user is thus to use a response function that optimizes the user's channel for each of the possible combined interference vectors resulting from the sequence of excitations intended for other users. Thus, at each use of the channel the user will use a pre-whitened channel model with noise having a statistically random component and a known component. The user will then formulate an SVD of the channel model and find the distribution of power among the scalar sub-channels of the SVD that minimizes the transmitted power with the capacity constrained to the specified value. This distribution of power and the SVD eigenfunctions used for transmission is the user's pure strategic response to the other user's known sequence of transmissions.

It should be noted here that the given user's adaptations at each sequence number is in response to known sequences of transmissions at other transmission numbers from other users. This adaptation will take place at each sequence number, so that it is, in realty, a sequence response to a sequence of interferences. The response functions are specific responses to specific interferences, so that these are the response functions of a so-called pure strategy for the user. All users will have response functions derived in a similar manner.

We have thus formulated a strategic form game for the multiple adaptations of the system users. The payoff function for each user is the (negative of) power that must be used to achieve the capacity specified for that user. The conditions of Glicksberg's Theorem apply, so that there is a so-called mixed strategy Nash equilibrium for the came, which is to say that there are random response functions for each user for which the adaptations of the system are stable.

In downstream transmission the individual line radiation patterns, $\phi_n$, are determined from the singular value decompositions of each user's channel formed between the line antenna and the user's receiver. The line radiation patterns for different users may be close to each other as indicated by the inner product, $(\phi_n, \phi_m)$. If two or more line radiation patterns have inner products close to one, then we might, with an abuse of language, think of the set of radiation patterns as being "almost linearly dependent". When this happens, it might be intuitively expected that a slight mistuning of the line antenna could easily lead to significant interference between the two concerned users' channels. A similar problem occurs in upstream transmission, when the received patterns from different users have inner products close to the product of their norms. This section addresses this issue by showing what happens in the relevant pattern frames when radiation or reception patterns are similar. It also demonstrates how this problem can be easily ameliorated by appropriate signal processing, rendering the system robust.

To see that the determination of the interference-free radiation patterns may be sensitive to small errors of construction, suppose the frame of transmission radiation patterns is spanned by $\{\phi_n\}$. Then, the frame operator may be written in the form $$Tf = \sum_n \phi_n(\phi_n, f) = \sum_n \lambda_n \xi_n (\xi_n, f) \tag{41}$$

In (41), $\lambda_n$ and $\theta_n$ re the eigenvalue and normalized eigenvector, respectively, of the frame operator:

$$T\xi_n = \lambda_n \xi_n \tag{42}$$

Since we are assuming that the frame set is linearly independent, the number of eigenvectors is the same as the number of frame vectors. From (41), we can construct the inverse of the frame operator:

$$T^{-1}f = \sum_n \frac{(\xi_n, f)}{\lambda_n} \xi_n \tag{43}$$

This expansion is valid because the frame operator is non-singular so that it has no zero eigenvalues.

The dual frame can be determined by applying (43) to the frame vectors:

$$\upsilon_n = \sum_m \frac{(\xi_m, \phi_n)}{\lambda_m} \xi_m \tag{44}$$

It is obvious from (44) that small errors in the specification of the $\{\phi_n\}$ will lead to large errors in the determination of the interference-free radiation patterns, i.e., the $\{\upsilon_n\}$, if any of the eigenvalues $\{\lambda_n\}$ of the frame operator are small.

To see what conditions would lead to small eigenvalues, consider the frame operator eigenvalue problem in a little more detail. From (1), it is apparent that any eigenvector can be expressed as a linear combination of the $\{\phi_n\}$. Thus, letting f be a generic eigenvector, $$f = \sum_n f_n \phi_n \tag{45}$$

Using this form in the eigenvalue problem for the frame operator leads to the following eigenvalue problem for the numerical vector representing the set $\{f_n\}$:

$$\lambda f_m = \sum_n (\phi_m, \phi_n) f_n \tag{46}$$

The secular equation for this problem is $$|(\phi_m, \phi_m) - \lambda \delta_{mn}| = 0 \tag{47}$$

where | | indicates a determinant of the enclosed quantities.

We will now show that when two of the frame functions are close to each other, one of the eigenvalues of the frame operator is small. Suppose that the determinant in (47) is an NXN determinant and that $\phi_N$ and $\phi_{N-1}$ are close to each other in the sense that $$(\phi_N,\phi_m)=(\phi_{N-1},\phi_m)-\epsilon g_m, \forall m \quad (48)$$

where $\epsilon$ is a small quantity and $g_m$ is defined by the equation in such a way that the vector of the $\{g_m\}$ is normalized. Subtract the $(N-1)^{th}$ column from the $N^{th}$ in (47). This leaves a determinant with terms proportional to $\epsilon$ in the right hand column except for an added $\lambda$ in the bottom right hand corner and in the slot just above it, as indicated in (49).

$$\begin{vmatrix} * & & & \epsilon g_1 \\ & * & & \\ & & \epsilon g_{N-2} & \\ & & & -\epsilon g_{N-1}+\lambda \\ * & * & \epsilon g_{N-1} & -\lambda \end{vmatrix} = 0 \quad (49)$$

We can express this determinant as the sum of two determinants that are equal except for their right hand columns, so that the secular equation may be written in the for $$\begin{vmatrix} 1-\lambda & (\phi_2,\phi_1) & & \epsilon g_1 \\ & & & \epsilon g_2 \\ & & 1-\lambda & * \\ (\phi_1,\phi_N) & & (\phi_{N-1},\phi_N) & \epsilon g_{N-1} \end{vmatrix} + \begin{vmatrix} 1-\lambda & (\phi_1,\phi_{N-1}) & 0 \\ & & 0 \\ & & \lambda \\ (\phi_1,\phi_N) & (\phi_{N-1},\phi_N) & -\lambda \end{vmatrix} = 0 \quad (50)$$

This equation may be written in the generic form $$\lambda F(\lambda)=\epsilon G(\lambda) \quad (51)$$

where $F(\lambda)$ and $G(\lambda)$ are polynomials in $\lambda$ that are defined by the determinant. This equation shows that at least one of the eigenvalues of the frame operator will be of order $\epsilon$ if (8) is satisfied. Of course, there may be more than one such pair of frame vectors. In any event, (11) shows that if the inner product of two of the frane vectors is close to one, then one of the solutions of the secular equation is a small eigenvalue, which leads to extreme sensitivity in the determination of the line transmission profiles that avoid interference.

The extreme sensitivity to slight variation in the $\{\phi_n\}$ can be avoided. To do this, suppose that it is determined that there is a collection of P eigenvectors, $\zeta_{N-P+1},\zeta_{N-P+2},\ldots\delta_N$, of the frame operator that have small eigenvalues. Then, form the projection operator P defined by $$Pf = \sum_{n=1}^{N-P} \xi_n(\xi_n,f) \quad (52)$$

This projection operator annihilates any vector in the subspace that is sensitive to slight variations in the specification of the frame vectors. By virtue of this projector, the eigenvalue problem of the singular value decomposition of a user's channel, i.e., (3.2), is replaced by a problem of the generic form $$\lambda^2 P\phi = P\check{C}CP\phi \quad (53)$$

Consequently, the projector modifies the channel operator for the user. Using this modified channel operator, all of the procedures presented previously in this paper can be executed to yield robust, interference-free transmission.

Channel Dimensionality

The dimensionality of the channel between one line antenna and one user's antenna. It is assumed that both antennas are multi-element arrays of dipoles and the sizes of the arrays are much smaller than the distance between them. For example, an array may be ten cm on a side while the arras are separated by at least ten meters.

The far field of a dipole antenna at a distance R from the dipole is proportional to $$\frac{e^{ikR}}{R}$$

where $$k\left(=\frac{2\pi}{\lambda}\right)$$

is the propagation constant. The constant of proportionality is irrelevant to our discussion.

If the transmitting and receiving dipoles are placed at points that are slightly offset from some base connecting vector, which we will call $R_o$, then the distance between the two may be written in the form $$R=R(R_o,\rho,r) \quad (54)$$

In (54), the function R has form that depends on the directions of the small offset vectors, but the lengths of the offsets are $\rho$ and r, respectively at the transmitter and receiver.

Since the offsets are very small compared to the array separation, we may approximate (54) very closely with a series expansion of R, retaining only the linear terms in the expansion:

$$R \cong R_o + \frac{\partial R}{\partial \rho}\rho + \frac{\partial R}{\partial r}r \quad (55)$$

We may write this in the form $$R=R_o+\alpha+a \quad (56)$$

with obvious definitions for $\alpha$ and a. Using this expansion converts the far field at the receiving dipole to the form $$\frac{e^{ikR_o}}{R_o}\frac{e^{ik\alpha}e^{ika}}{\left(1+\frac{\alpha+a}{R_o}\right)}$$

Since a and a are both very small compared to $R_o$, the term in parentheses may be dropped.

Now suppose that there are N transmitting dipoles indexed by n and M receiving dipoles indexed by m. Then, the field at the m$^{th}$ receiving dipole is proportional to $$e_m = e^{ik\alpha_m} \sum_{n=1}^{N} s_n e^{ik\alpha_n}$$

where $s_n$ is the complex source driving the n$^{th}$ transmitting dipole.

Two observations can be made about this expression immediately:

A matching receiver would have its tap gains proportional to $e^{-ik\alpha_m}$ for any collection of $\{S_n\}$ The best set of transmitting source intensities is proportional to $e_{-ik\alpha}{}^n$. Any set of sending intensities would have to be a linear combination of this set and a set that had absolutely no effect at the reception point because it would be orthogonal to the set $\{e^{-ik\alpha_n}\}$.

In this sense, there is only one radiation pattern that affects the receiving array and the channel between the two arrays is one-dimensional.

It should be noted that the system analyzed herein could be used to facilitate two-way communication between any array of system antennas and a collection of independent users. Thus, e.g., the system could be used for ad-hoc networks with line antennas on mobile platforms and users moving about. In addition the overall capacity of the system is easily modified by the addition of more system antennas. In this context, the system could alleviate the need for bay station antennas in areas served by fiber-coax systems.

The system has dynamic overall capacity that can easily be increased in any specific geographical area along its route. For example, if a new development arrives along the route, it is only necessary to install more line antennas and transponders. To accommodate such development, the access line may be branched, looped, or multiplied to provide added line capacity. For that matter, downstream communication could be on one line while upstream is on another, and added line capacity can be achieved. If, on the other hand, the density of customers' increases to the point that suppression of interference becomes more difficult, the addition of more line antennas, increasing the dimensionality of the transmission space, would provide the means of improved crosstalk performance. Of course, the effectiveness of such measures depends on the dimensionality of the receivers' spaces.

The present invention was described in terms of the transmission of a radiation pattern at a given instant in time in both directions. However, the invention is not limited to such description as there is nothing in the analysis that precludes interpreting the results as if the radiated patterns were actually sequences of radiated vectors. If this were the case, the eigenvectors of the SVDs of users' channels would be sequences of instantaneous vectors and the corresponding reception vectors would be interpreted as sequences of instantaneous reception vectors. Such an interpretation of the results given leads to an accommodation by the system to time-space coding techniques.

The various modules, apparatus, systems or methods described alone in accordance with various aspects of the present invention may comprise any combination of software or firmware and hardware, including processors, micro-processors, application specific integrated circuits, as well as integrated circuits in general. The software modules may also be employed in processors based on a DOS, UNIX or other platforms.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An apparatus, comprising:
a first module for generating one or more basis vectors based on channel parameters of multiple users;
a second module for computing one or more antenna excitation parameters, the antenna excitation parameters being associated with information streams intended for one or more users, the computed antenna excitation parameters being based on the one or more basis vectors and used to transmit the information streams to a plurality of user receivers; and
a plurality of antennas coupled to the second module and operable to generate coordinated radiation patterns to the plurality of user receivers based on the computed antenna excitation parameters.

2. The apparatus of claim 1, further comprising an encoder operable to encode each antenna excitation parameters onto a drive signal that is used to generate the coordinated radiation patterns.

3. The apparatus claim 1, further comprising an encoder operable to encode the antenna excitation parameters onto a drive signal that is used to generate a set of the coordinated radiation patterns on one or more antennas that transmits the information streams to an intended user by radiating substantially lower signal levels to locations of specified users other than the intended user to provide secure communication at a desired capacity.

4. The apparatus of claim 1, wherein the channel parameters comprise parameters measured from a wireless channel.

5. The apparatus of claim 1, wherein the information is transmitted using data packets.

6. The apparatus of claim 5, wherein the data packets are encoded in accordance with the Internet Protocol.

7. The apparatus according to claim 1, wherein
the second module is configured to generate an eigenvector of a plurality of separate sub-channels for the predetermined user receiver as a combination of one of the one or more vectors.

8. The apparatus of claim 1, wherein the information is transmitted in synchronous data streams.

9. The apparatus of claim 1, wherein at least of the user receivers comprises one or more spatial filters, each of the one or more spatial filters being associated with an eigenvector assigned to a predetermined user and operable to assign gain signals to a predetermined user antenna to produce a spatial filter output signal whose received channel vector delivers an information stream to only the predetermined user.

10. A system for transmitting signals over a network, comprising:
a processor for accumulating packets destined for one or more subscribers on the network and for computing a set of coordinated antenna excitation parameter vectors for a plurality of line antennas in the network; and an encoder for encoding each of the coordinated antenna excitation vectors into one or more data blocks, each of the data blocks being addressed to different transponders associated with the plurality of line antennas such that the transponders excite the plurality of line antennas using one or more of the coordinated antenna excitation parameter vectors to produce coordinated radiation patterns that define a plurality of separate sub-channels for the one or more subscribers.

11. The system of claim 10, further comprising a signal generator for generating a signal associated with the coordinated radiation patterns.

12. The system of claim 10, wherein the transponders store the one or more basis vectors and generate each of the coordinated radiation patterns from the coded data blocks.

13. The system of claim 10, further comprising means for measuring different channel characteristics associated with the network, the characteristics being used to generate a plurality of excitation vectors for antennas comprising the network.

14. The system of claim 10, wherein the antennas operate in accordance with the IEEE 802.11 protocol.

15. The system of claim 10, wherein the network comprises a hybrid fiber coaxial network.

16. The system of claim 10, wherein the subscribers use mobile units to communicate with the network.

17. The system of claim 10, wherein the antennas comprise a superantenna that determines the intended recipient by generating a radiation pattern that delivers signal power to a location of an intended subscriber and minimal power to locations of other specified subscribers.

18. The system of claim 10, further comprising a buffer for temporarily storing the packets accumulated by the processor.

19. The system of claim 10, wherein the processor computes one or more basis vectors that are used to generate each of the coordinated radiation patterns.

20. The system for transmitting signals according to claim 10, wherein the encoder is further configured to generate at least one coordinated radiation excitation vector, the vector comprising an eigenvector of the plurality of the separate sub-channels of the one or more subscribers.

21. A method for preparing information for transmittal over a network, comprising:

receiving a set of information streams associated with users on the network, converting the information streams into a set of coordinated radiation patterns based on channel transfer characteristics of a plurality of users, and superposing the coordinated radiation patterns associated with different users so as to define a plurality of separate sub-channels on a plurality of antennas such that each coordinated radiation pattern is configured to deliver a select portion of the set of information streams to a location of a predetermined destination receiver.

22. The method of claim 21, further comprising encoding the information streams into data blocks specifying antenna excitation vectors that produce the superposed coordinated radiation patterns.

23. The method of claim 22, further comprising transmitting the data blocks to at least one transponder.

24. The method of claim 23, further comprising converting, by the at least one transponder, the block data into at least one radiation pattern that is radiated in concert with other radiation patterns.

25. The method according to claim 21, wherein said converting includes generating an antenna excitation vector for one of the plurality of radiation patterns, the vector adapting to an eigenvector of the plurality of separate sub-channels of an intended user.

* * * * *